(12) United States Patent
Bertrand et al.

(10) Patent No.: US 8,125,885 B2
(45) Date of Patent: Feb. 28, 2012

(54) FREQUENCY OFFSET ESTIMATION IN ORTHOGONAL FREQUENCY DIVISION MULTIPLE ACCESS WIRELESS NETWORKS

(75) Inventors: Pierre Bertrand, Antibes (FR); Tarik Muharemovic, Dallas, TX (US); Slaheddine Aridhi, Vence (FR)

(73) Assignee: Texas Instruments Incorporated, Dallas, TX (US)

( * ) Notice: Subject to any disclaimer, the term of this patent is extended or adjusted under 35 U.S.C. 154(b) by 147 days.

(21) Appl. No.: 12/501,996

(22) Filed: Jul. 13, 2009

(65) Prior Publication Data

US 2010/0080112 A1    Apr. 1, 2010

Related U.S. Application Data

(60) Provisional application No. 61/100,104, filed on Sep. 25, 2008, provisional application No. 61/095,405, filed on Sep. 9, 2008, provisional application No. 61/079,933, filed on Jul. 11, 2008.

(51) Int. Cl.
*H04J 11/00* (2006.01)
(52) U.S. Cl. .................................... 370/203
(58) Field of Classification Search .......... 370/203–211, 370/310, 328–330; 455/39, 507, 59–63, 455/66
See application file for complete search history.

(56) References Cited

U.S. PATENT DOCUMENTS

| | | | | |
|---|---|---|---|---|
| 7,649,963 B2 * | 1/2010 | Choi et al. | ...................... | 375/340 |
| 2006/0176802 A1 * | 8/2006 | Ko et al. | .......................... | 370/208 |
| 2008/0037508 A1 * | 2/2008 | Na et al. | .......................... | 370/348 |
| 2008/0233960 A1 | 9/2008 | Kangude et al. | | |
| 2008/0279322 A1 * | 11/2008 | Franovici et al. | .............. | 375/371 |
| 2010/0183104 A1 * | 7/2010 | Alexander et al. | ............ | 375/346 |

OTHER PUBLICATIONS

European Telecommunications Standard, "Digital Cellular Telecommunications System (Phase 2+); Radio Transmission and Reception", ETS 300 910, Apr. 1997, Entire Document, Valbonne, France, 48 pages.

3rd Generation Partnership Project (3GPP), Technical Specification Group Radio Access Network; Evolved Universal Terrestrial Radio Access (E-UTRA); Base Station (BS) Radio Transmission and Reception (Release 8), 3GPP TS 36.104 V8.2.0, May 2008, Entire Document, Valbonne, France, 59 pages.

Morelli, et al., "Synchronization Techniques for Orthogonal Frequency Division Multiple Access (OFDMA): A Tutorial Review", Proceedings of the IEEE, vol. 95, No. 7, Jul. 2007, Entire Document, 34 pages.

* cited by examiner

*Primary Examiner* — Dmitry H Levitan
(74) *Attorney, Agent, or Firm* — Robert D. Marshall, Jr.; W. James Brady; Frederick J. Telecky, Jr.

(57) ABSTRACT

A method of wireless transmission for estimating the carrier frequency offset in a base station of a received transmission from a user equipment (UE) accessing a radio access network. The method time de-multiplexes selected symbols of a received sub-frame, computes the frequency-domain symbols received from each antenna through an FFT, de-maps the UEs selected sub-carriers for each antenna, computes metrics associated to a carrier frequency offset hypothesis spanning a searched frequency offset window, repeats these steps on subsequent received sub-frames from the UE over an estimation interval duration, non-coherently accumulates the computed metrics and selects the carrier frequency offset hypothesis with largest accumulated metric amplitude.

21 Claims, 12 Drawing Sheets

FREQUENCY OFFSET ESTIMATION IN ORTHOGONAL FREQUENCY DIVISION MULTIPLE ACCESS WIRELESS NETWORKS

CLAIM OF PRIORITY

This application claims priority under 35 U.S.C. 119(e)(1) to U.S. Provisional Application No. 61/079,933 filed Jul. 11, 2008, U.S. Provisional Application No. 61/095,405 filed Sep. 9, 2008 and U.S. Provisional Application No. 61/100,104 filed Sep. 25, 2008.

TECHNICAL FIELD OF THE INVENTION

The technical field of this invention is wireless communication.

BACKGROUND OF THE INVENTION

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UEs data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Long Term Evolution (LTE) wireless networks, also known as Evolved Universal Terrestrial Radio Access Network (E-UTRAN), are being standardized by the 3GPP working groups (WG). Orthogonal frequency division multiple access (OFDMA) and SC-FDMA (single carrier FDMA) access schemes were chosen for the down-link (DL) and up-link (UL) of E-UTRAN, respectively. User Equipments (UEs) are time and frequency multiplexed on a physical uplink shared channel (PUSCH) and time and frequency synchronization between UEs guarantees optimal intra-cell orthogonality. In UL, frequency offsets (FO) can be due to local oscillator (LO) drifts at both the UE and the Base Station, also referred to as eNodeB, but also to the UE speed translating into Doppler shift in line of sight (LOS) propagation conditions. If the large sub-carrier spacing of LTE (15 kHz) makes it robust with respect to orthogonality loss due to Doppler shift, since even high speed trains would not generate a Doppler shift exceeding one tenth of a sub-carrier, the frequency offset still has a negative impact on Block Error Rate (BLER) due to fast channel variation within a sub-frame:

Rayleigh TU channel: FO range of 0 to 300 Hz with the maximum frequency inaccuracies at eNB of 0.05 ppm and at UE of 0.1 ppm;

Additive White Gaussian Noise (AWGN) (LOS) channel: FO range of 0 to 1600 Hz with the UE speed translating into Doppler shift.

FIG. 2 shows the BLER performance degradation due to various frequency offsets with quadrature phase shift keying (QPSK) modulation and turbo coding rate of ⅓ with AWGN. FIG. 3 similarly shows the BLER performance degradation with TU-6 fading channel. There is a need to estimate and remove the frequency offset before channel estimation and demodulation. This invention is a frequency estimation method which applies directly on the de-mapped frequency sub-carriers of a UEs symbol and compares its performance with other published methods.

On top of these scenarios, the 3GPP Working Group #4 defined propagation channels specifically addressing the frequency offset estimation and compensation function which worst-case scenarios are expected to be encountered along High Speed Trains (HST) lines. FIG. 4 illustrates the frequency offset time behavior of both channels. FIG. 5 illustrates the resulting frequency variations observed within a 30 ms interval.

In an additional channel scenario, Rician fading is considered where Rician factor K=10 dB is the ratio between the dominant signal power and the variant of the other weaker signals.

It is clear from FIGS. 4 and 5 that in order to track the abrupt frequency offset variations of the HST scenarios, the eNB must permanently estimate the frequency offset of each UE. This patent application assumes the following scheme for concurrent frequency offset estimation and compensation illustrated in FIG. 6. In FIG. 6 frequency estimation is performed for a given UE during an estimation interval 610 and a frequency estimate is issued at the end of interval 610. During a given estimation interval 620 of a given UE, the frequency estimate issued by the previous interval 610 is replaced.

SUMMARY OF THE INVENTION

This patent application details the design choices for the LTE frequency offset estimation and compensation, from theoretical derivations and performance evaluations. It is shown that the state-of-the-art does not satisfactorily addresses the high-end performance requirements of LTE so that an alternate approach is needed. This invention is a maximum-likelihood based solution using the available frequency-domain interference-free symbols de-mapped (or de-multiplexed) at the output of the Fast Fourier Transform (FFT) of an OFDMA multi-user receiver. The estimator operates on frequency-domain OFDMA user symbols extracted from an OFDMA multiplex with sub-carrier modulation is known a-priori. Other solutions either rely on pilot repetition or on an interference-free cyclic prefix (CP) not used in OFDMA systems such as LTE.

BRIEF DESCRIPTION OF THE DRAWINGS

These and other aspects of this invention are illustrated in the drawings, in which.

DETAILED DESCRIPTION OF PREFERRED EMBODIMENTS

Figure 7:
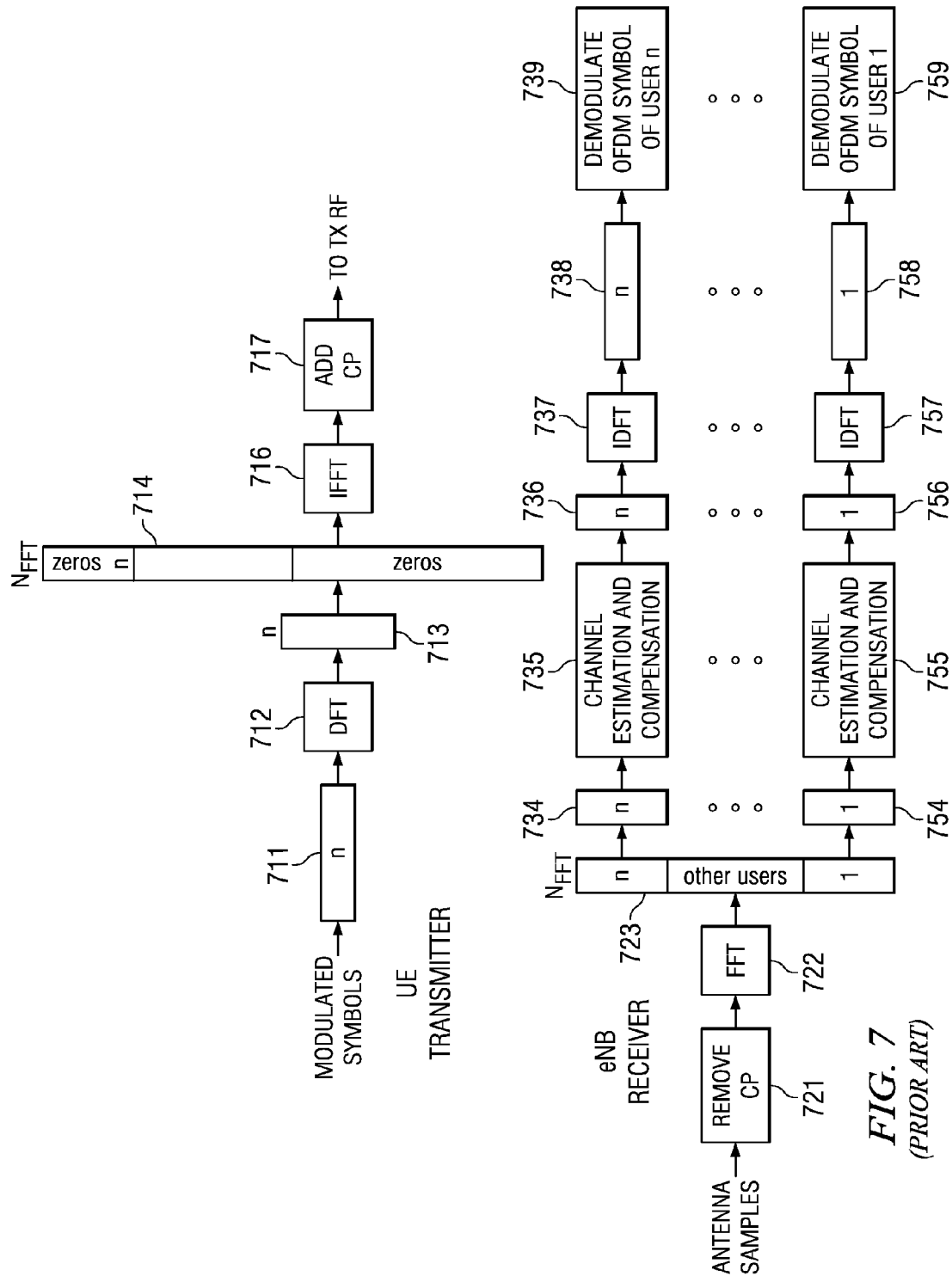
FIG. 7 illustrates the principles of the single carrier frequency division multiple access (SC-FDMA) UL transmitter and receiver of LTE.

FIG. 7 illustrates the principles of the single carrier frequency division multiple access (SC-FDMA) UL transmitter and receiver of LTE. The SC-FDMA scheme is also referred to as discrete Fourier transform spread orthogonal frequency division multiplexing (DFT-SOFDM) and is an OFDMA system with subband carrier assignment scheme (CAS). For the UE transmitter coder 711 encodes received modulated symbols. These are transformed into the frequency domain by discrete Fourier transform (DFT) 712. These are filtered by filter 713. Block 714 combines the symbols with zeros to fill particular slots. Block 715 is an inverse Fast Fourier Transform (IFFT) which converts back into the time domain. Block 716 adds the cyclic prefix (CP) for transmission via the antenna (TxRF). For the base station (eNB) receiver block 721 removes the cyclic prefix. Block 722 is a Fast Fourier Transform (FFT). Filter 723 separates the channels corresponding to separate UEs. Processing continues with one channel for each active UE. FIG. 7 illustrates two channels. The two channels include filters 734 and 754. Blocks 735 and 755 perform channel estimation and compensation. Following filters 736 and 756, blocks 737 and 757 return to the time domain by an inverse discrete Fourier transform (IDFT). Filters 738 and 758 drive respective demodulators 739 and 759 which recover the originally transmitted signals.

Figure 8:
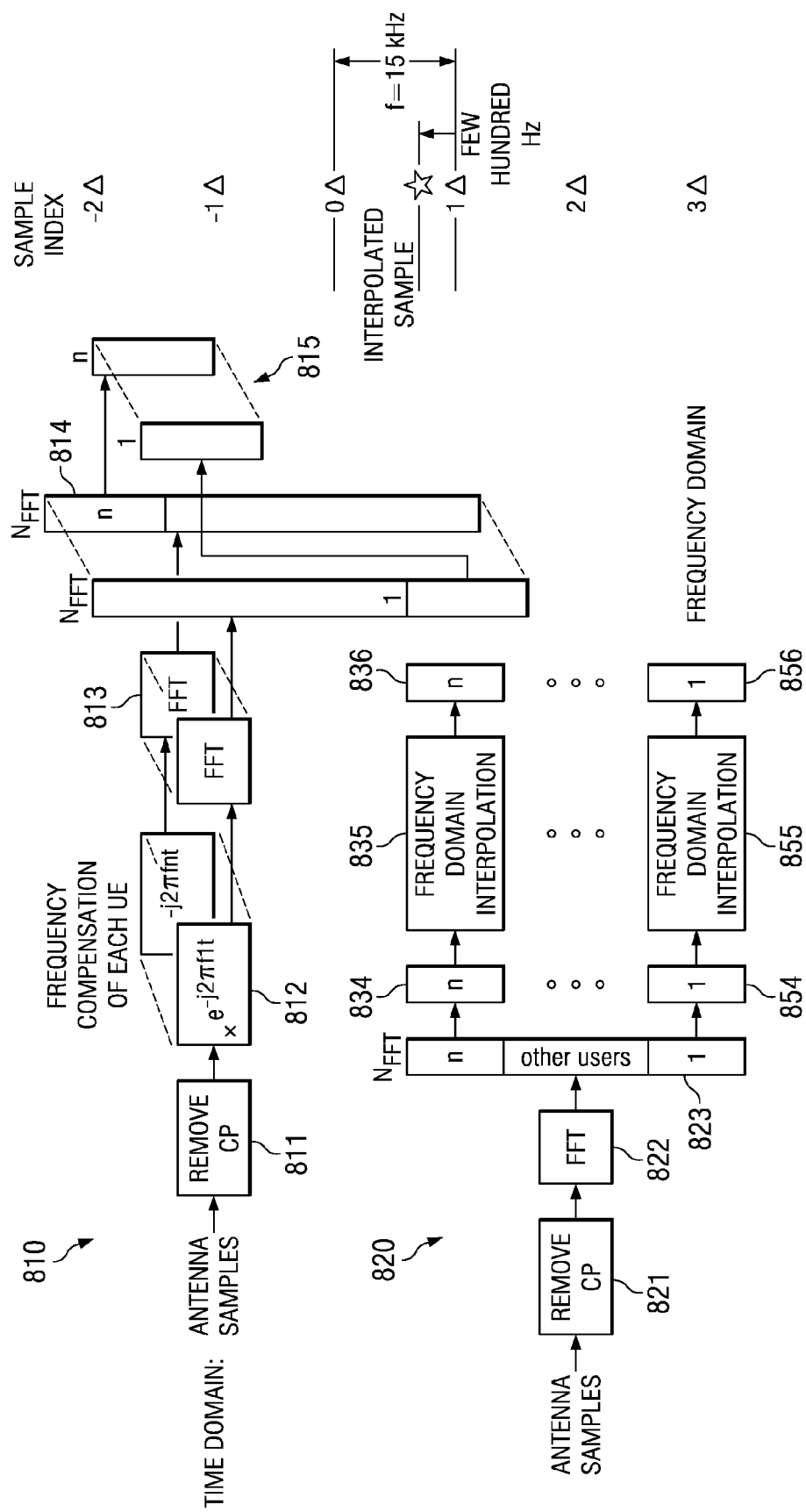
FIG. 8 illustrates two ways to remove the frequency offset once frequency offset compensation has been estimated.

FIG. 7 assumes no frequency offset so frequency offset compensation is not shown. FIG. 8 illustrates two ways to remove the frequency offset once frequency offset compensation has been estimated at the base station receiver: time-domain frequency offset compensation 810; and frequency-domain frequency offset compensation 820. In time-domain frequency offset compensation block 811 removes the cyclic prefix from the received signals. A bank of frequency compensating filters 812 for each active UE frequency compensates by $e^{-j2\pi f(i)t}$. Block 813 converts this into the frequency domain via a Fast Fourier Transform (FFT). Filter 814 separates the signals corresponding to the individual UEs 815. In frequency-domain frequency offset compensation block 821 removes the cyclic prefix. Block 822 converts into the frequency domain via a Fast Fourier Transform (FFT). Filter 823 separates the corresponding to the individual UEs. Each UE channel includes filters 834 and 835, a frequency domain interpolation 835 and 855 to generate the individual UE signals 836 and 856.

The frequency-domain interpolation FIG. 8 820 operates on de-mapped frequency sub-carriers of a given UE as follows:

$$Z_i(k, \varepsilon) = \frac{1}{N_{FFT}} \sum_{l=0}^{N_{sc}-1} Z(l)C(l-k, \varepsilon) \qquad (1)$$

where: $N_{FFT}$ is the FFT size; $N_{SC}$ is the UE allocation size in sub-carriers; $\epsilon$ is the normalized frequency shift equal to $\delta f/\Delta f_{sc}$; $C(l-k,\epsilon)$ are the interpolator coefficients; $Z_i(k,\epsilon)$ is the interpolated point from the Z(l) points. Further:

$$C(k, \varepsilon) = \frac{\sin\pi(k+\varepsilon)}{\sin(\pi(k+\varepsilon)/N_{FFT})} e^{j\pi(k+\varepsilon)\frac{N_{FFT}-1}{N_{FFT}}} \qquad (2)$$

According to the expression of Equation (1) this method is also called frequency offset compensation through circular convolution. This is derived as follows. Let Z(k), k=0 . . . $N_{SC}-1$ be the frequency complex samples at the DFT output of the UE transmitter in FIG. 7. The Z(k) samples are mapped onto a wideband signal $Z_{WB}(k)$ as:

$$Z_{WB}(k) = \begin{cases} Z(k-k_1); & k = k_1, k_1+1, \ldots, k_1+N_{SC}-1 \\ 0 & \text{elsewhere} \end{cases} \qquad (3)$$

This signal is then converted into the time domain for transmission. The cyclic prefix plays no role in this derivation so it is omitted without loss of generality. This conversion is as follows:

$$z_{WB}(n) = \frac{1}{\sqrt{N_{FFT}}} \sum_{k=0}^{N_{FFT}-1} Z_{WB}(k) e^{j2\pi kn/N_{FFT}} \quad (4)$$

$$= \frac{1}{\sqrt{N_{FFT}}} \sum_{k=0}^{N_{SC}-1} Z(k) e^{j2\pi (k+k_1)n/N_{FFT}}$$

$$= \frac{e^{j2\pi nk_1/N_{FFT}}}{\sqrt{N_{FFT}}} \sum_{k=0}^{N_{SC}-1} Z(k) e^{j2\pi kn/N_{FFT}}$$

The normalized frequency offset $$\varepsilon = \frac{\delta f}{f_{sc}},$$

where $\delta f$ is the frequency offset (Hz) and $f_{sc}$ is the sub-carrier spacing, applies to the time domain signal as:

$$z_{WB-FO}(n, \varepsilon) = z_{WB}(n) e^{j2\pi n\varepsilon/N_{FFT}} \quad (5)$$

$$= \frac{e^{j2\pi nk_1/N_{FFT}}}{\sqrt{N_{FFT}}} \sum_{k=0}^{N_{SC}-1} Z(k) e^{j2\pi (k+\varepsilon)n/N_{FFT}}$$

At the receiver, the frequency domain signal $Z_{WB-FO}$ is obtained by applying an FFT to $z_{WB-FO}$:

$$Z_{WB-FO}(k, \varepsilon) = \frac{1}{\sqrt{N_{FFT}}} \sum_{n=0}^{N_{FFT}-1} z_{WB-FO}(n, \varepsilon) e^{-j2\pi kn/N_{FFT}} \quad (6)$$

$$= \frac{1}{N_{FFT}} \sum_{n=0}^{N_{FFT}-1} \left[ \sum_{l=0}^{N_{SC}-1} Z(l) e^{j2\pi (l+k_1+\varepsilon)n/N_{FFT}} \right] e^{-j2\pi kn/N_{FFT}}$$

$$= \frac{1}{N_{FFT}} \sum_{l=0}^{N_{SC}-1} Z(l) \sum_{n=0}^{N_{FFT}-1} e^{j2\pi (l+k_1-k+\varepsilon)n/N_{FFT}}$$

Finally, the de-mapped signal $Z_{FO}(s, \epsilon)$ is extracted from $Z_{WB-FO}$ as follows:

$$Z_{FO}(s, \varepsilon) = Z_{WB-FO}(k = k_1 + s, \varepsilon); s = 0 \ldots N_{SC} - 1 \quad (7)$$

$$= \frac{1}{N_{FFT}} \sum_{l=0}^{N_{SC}-1} Z(l) \sum_{n=0}^{N_{FFT}-1} e^{j2\pi (l-s+\varepsilon)n/N_{FFT}}$$

$$= \frac{1}{N_{FFT}} \sum_{l=0}^{N_{SC}-1} Z(l) C(l - s, \varepsilon)$$

where:

$$C(k, \varepsilon) = \sum_{n=0}^{N_{FFT}-1} e^{j2\pi n(k+\varepsilon)/N_{FFT}} \quad (8)$$

$$= \frac{\sin \pi (k+\varepsilon)}{\sin(\pi (k+\varepsilon)/N_{FFT})} e^{j\pi (k+\varepsilon)\frac{N_{FFT}-1}{N_{FFT}}}$$

The interpolation coefficients apply directly onto the demapped symbol sub-carriers and are not dependent on the UE location in the frequency multiplex, here modelled by the origin $k_1$ of the user's sub-carrier mapping. Thus once the frequency offset is known at the receiver, the same set of coefficients can be used for a given UE and allocation size irrespective of its sub-carrier mapping. The coefficient set for smaller number of sub-carriers allocation is a sub-set of the coefficient set of larger number of sub-carriers allocation. The set of interpolator coefficients for a given frequency offset can be computed once for the largest allocation size and stored in a look up table (LUT) to be used for smaller allocation sizes. For example for a 20 MHz LTE spectrum, the maximum allocation is 1200 sub-carriers so that the storage requirements for the interpolator of a given UE is 1200 complex coefficients, each of 2 by 16 bits for a total of 4.69 KBytes.

Table 1 assumes a 20 MHz LTE spectrum, with the following numerology from 3GPP TS 36.211 v8.1.0 2007-11 standard.

TABLE 1

| | |
|---|---|
| Symbol duration | 66.67 μs |
| Spectrum | 20 MHz |
| BW efficiency | 90% |
| Sampling rate | 30.72 Msps |
| Sub-carrier size | 15 kHz |
| FFT size | 2048 |
| RB size | 12 subcarriers = 180 kHz |
| Number of RBs | 100 |

Figure 1:
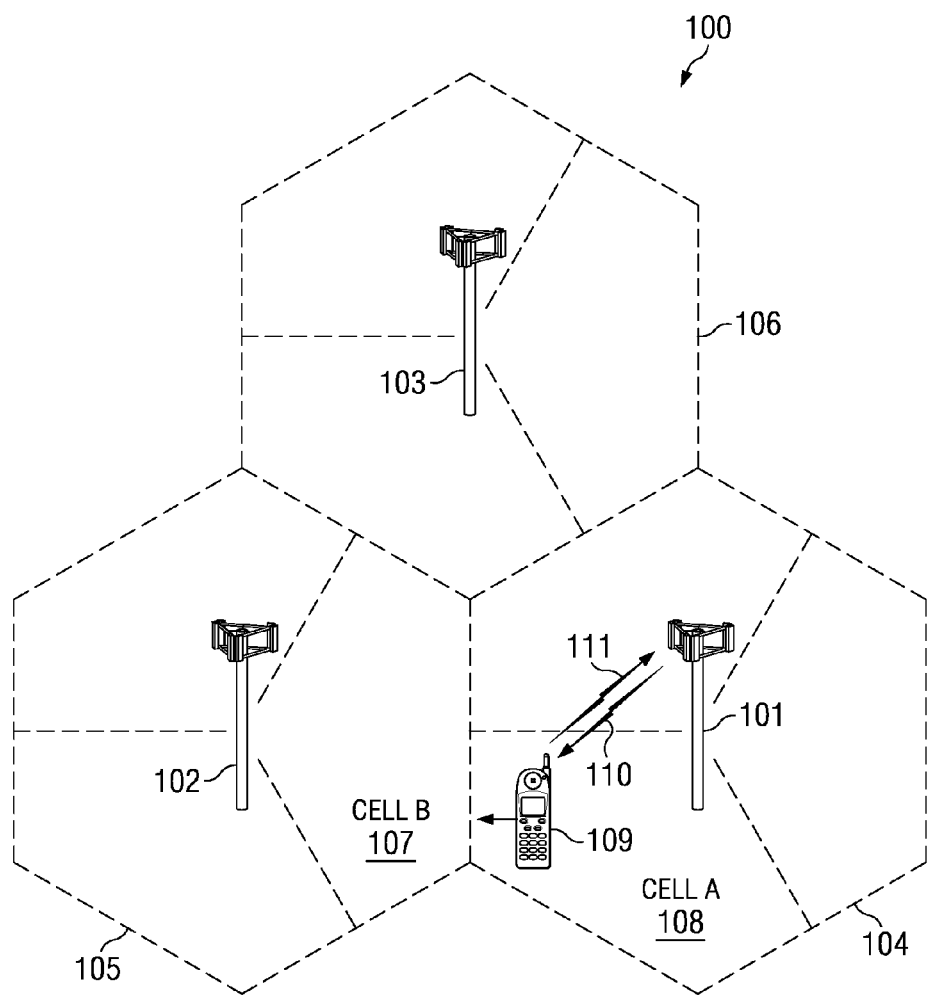
FIG. 1 is a diagram of a communication system of the prior art related to this invention having three cells.
Figure 2:
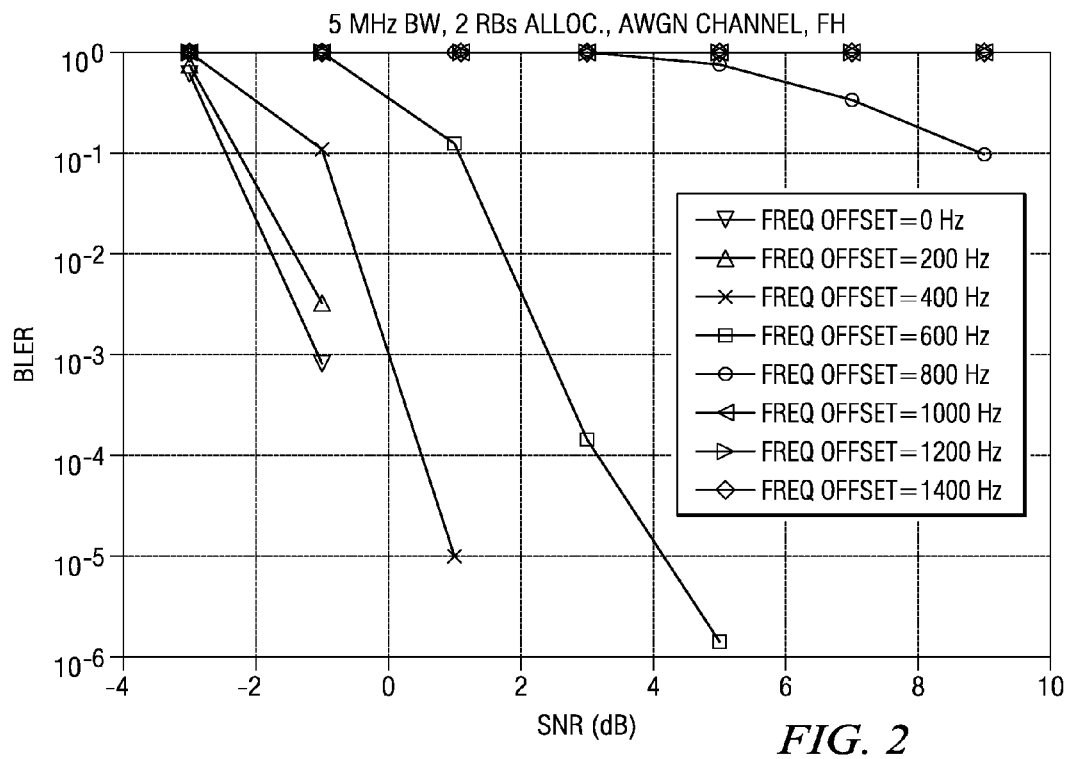
FIG. 2 illustrates the BLER performance degradation due to various frequency offsets with quadrature phase shift keying (QPSK) modulation and turbo coding rate of ⅓ with AWGN.
Figure 3:
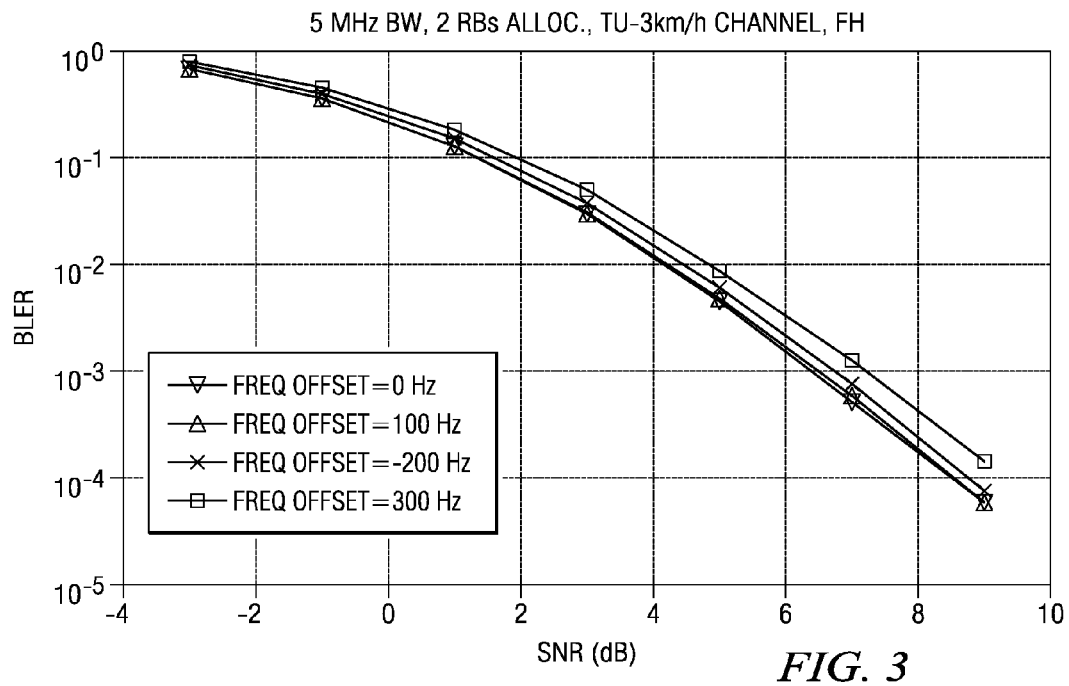
FIG. 3 is similar to FIG. 2 and illustrates the BLER performance degradation with TU-6 fading channel.
Figure 4:
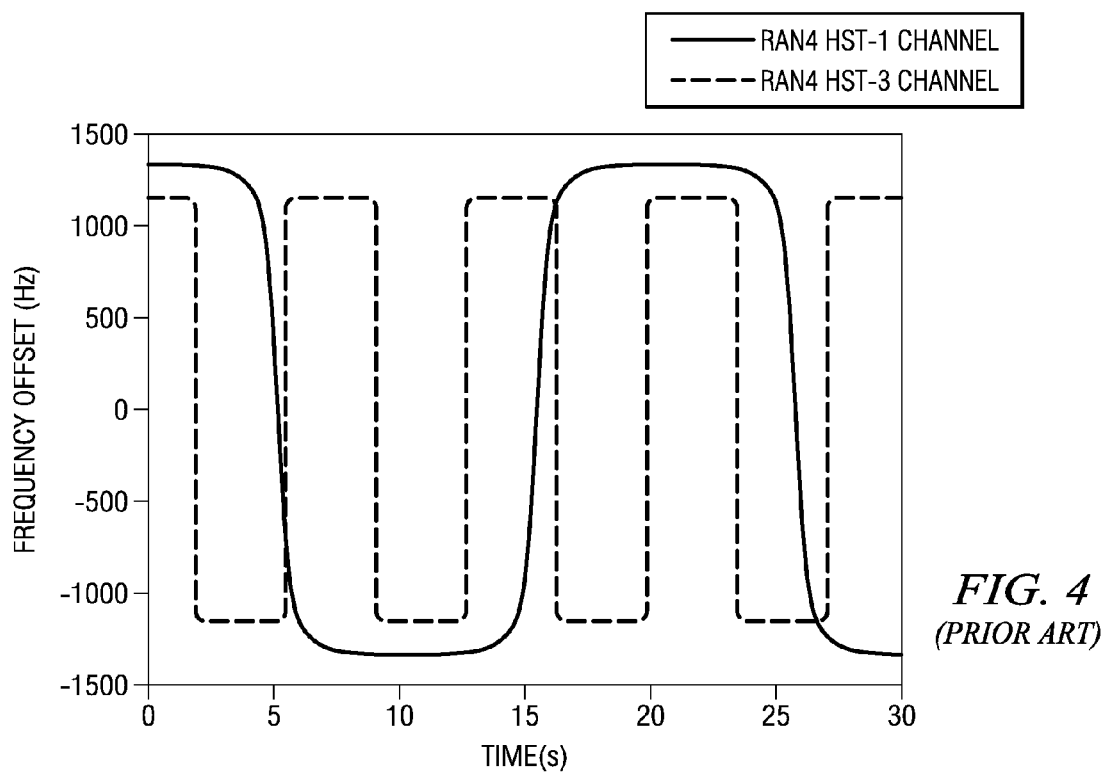
FIG. 4 illustrates the frequency offset time behavior of two channel types.
Figure 5:
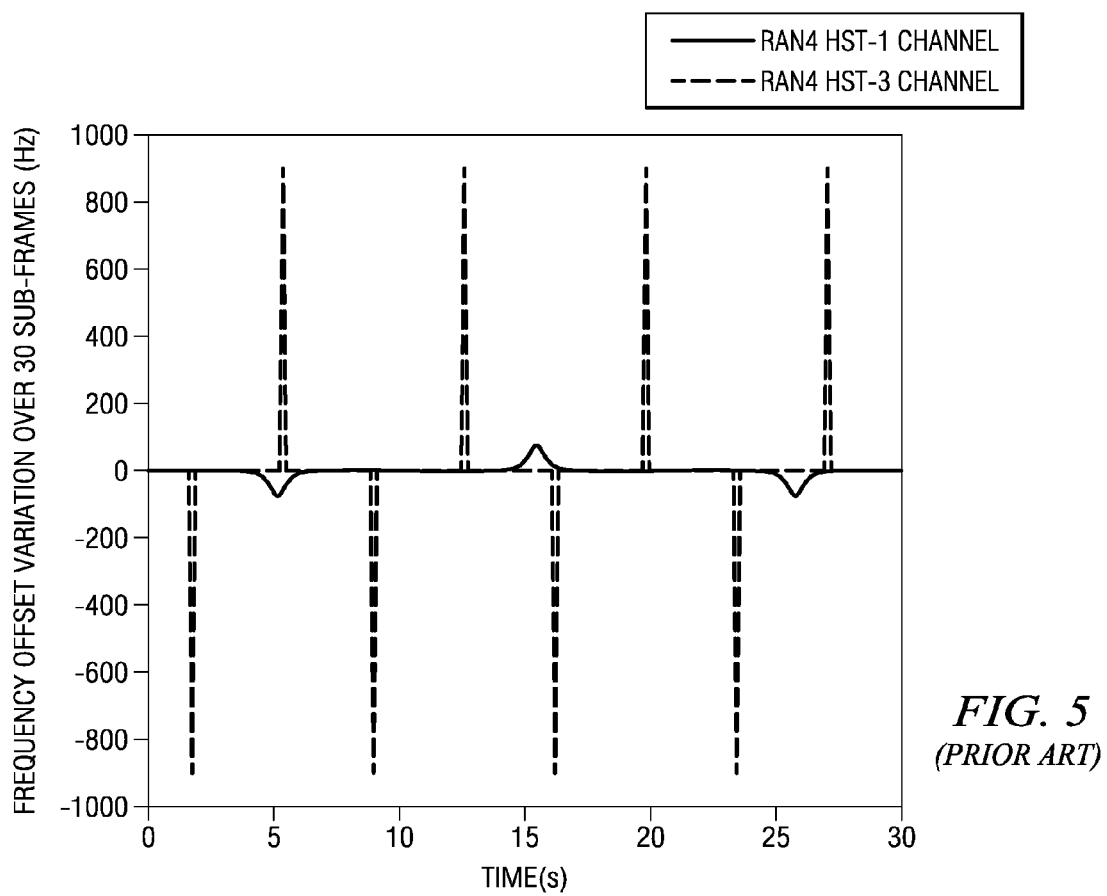
FIG. 5 illustrates the resulting frequency variations in these two channel types observed within a 30 ms interval.
Figure 6:
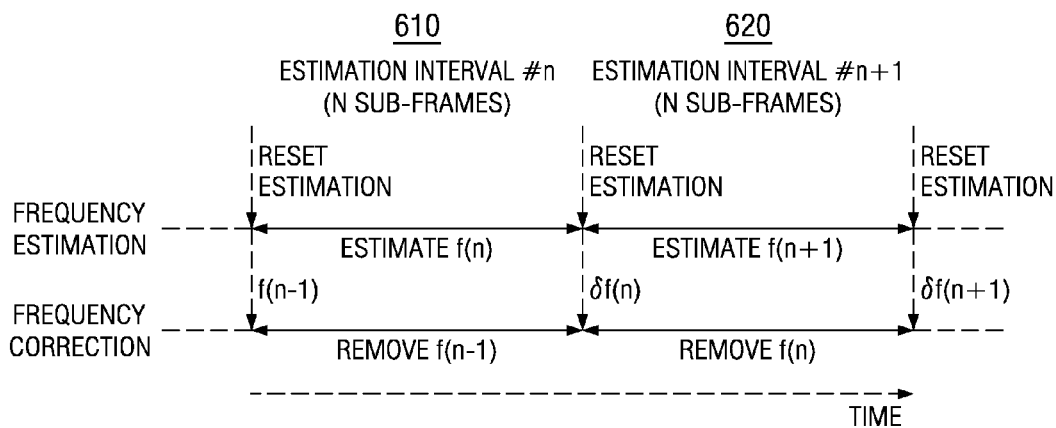
FIG. 6 illustrates the invention for concurrent frequency offset estimation and compensation.
Figure 9:
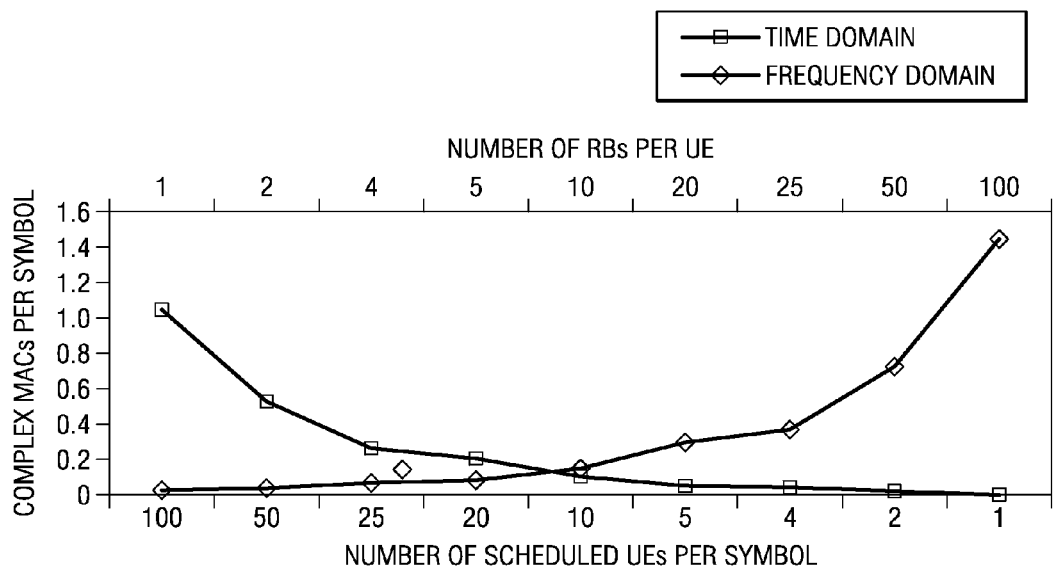
FIG. 9 illustrates the number of complex multiples required for various time and frequency-domain FO compensation methods for the full range of allocated RBs per UE.

Table 2 is an example of complexity comparison in the number of complex multiplications. Table 2 lists the number of complex multiples required for various time and frequency-domain FO compensation methods. Table 2 assumes 50 UEs each with two allocated resource blocks (RBs) frequency multiplexed in a 20 MHz symbol. The complexity of the radix-4 FFT is taken as $3*N_{FFT}/4*(\ln(N_{FFT})/\ln(4))$ and the complexity of the frequency domain FO compensation is taken as $N_{SC}^2$. FIG. 9 illustrates this comparison for the full range of allocated RBs per UE.

TABLE 2

| Number of | Time domain | | Frequency domain | |
|---|---|---|---|---|
| complex multiplies | TD freq comp | radix-4 FFT | radix-4 FFT | FD freq comp. |
| Common to all UEs | | | 8448 | |
| Per UE | 2048 | 8448 | | 576 |
| Sub-total | 102400 | 844800 | 8448 | 28800 |
| Total | 947200 | | 37248 | |

Table 2 and FIG. 9 show frequency-domain FO compensation is more efficient than the time-domain FO compensation when the number of multiplexed UEs per symbol exceeds about 10% of the multiplexing capacity.

In OFDMA and SC-FDMA systems such as LTE, the estimated UL frequency offset of each multiplexed UE in an OFDM or SC-FDMA symbol is removed in frequency domain after sub-carrier de-mapping by means of the frequency domain interpolator defined in Equations (1) and (2).

The interpolation coefficients apply directly onto the demapped symbol sub-carriers. The are not dependent on the UE location in the frequency multiplex. Therefore the same set of coefficients can be used for a given UE and allocation size irrespective of its sub-carrier mapping.

The coefficient set for smaller number of sub-carriers allocation is a sub-set of the coefficient set of larger number of sub-carriers allocation. Thus the set of interpolator coefficients for a given frequency offset can be computed once for the largest allocation size and stored in a LUT to be used for smaller allocation sizes.

Most algorithms published on the topic of frequency offset estimation in OFDM systems are variations of the Correlation Based method that can be used both in time and frequency domains. Let $z_n$ be a sequence of time domain complex samples such that some of these samples are duplicated in time:

$$z_{n+LN} = z_n; n=0,1,\ldots,N-1; N,L \text{ integers} \quad (9)$$

This sequence is transmitted over the air and received distorted at the demodulator unit by AWGN samples $w_n$ and a frequency offset $\delta f$:

$$r_n = z_n e^{j2\pi n \delta f/f_s} + w_n \quad (10)$$

where: $f_s$ is the sampling rate. The correlation $\rho$ in time of the received repeated samples is:

$$\rho = \sum_{n=0}^{N-1} r_n r_{n+LN}^* \quad (11)$$

with a statistical average of:

$$\langle \rho \rangle = e^{-j2\pi LN\delta f/f_s} \sum_{n=0}^{N-1} |z_n|^2 \quad (12)$$

A non-biased estimator for the normalized frequency offset $\epsilon = N \delta f/f_s$ is:

$$\hat{\epsilon} = -\frac{\angle \rho}{2\pi L} \quad (13)$$

The same estimator can be derived in frequency domain as follows. The N-length FFT $R_k$ of the received samples $r_n$ is:

$$R_k = \frac{1}{\sqrt{N}} \sum_{n=0}^{N-1} r_n e^{-j2\pi nk/N} = \frac{1}{\sqrt{N}} \sum_{n=0}^{N-1} z_n e^{-j2\pi n(k-\epsilon)/N} + w_n' \quad (14)$$

where: $w_n'$ are AWGN samples with same statistical properties as $w_n$. Similarly, the N-length FFT $R_k'$ of the received samples $r_{n+LN}$ is:

$$R_k' = \frac{1}{\sqrt{N}} \sum_{n=0}^{N-1} r_{n+LN} e^{-j2\pi nk/N} \quad (15)$$

$$= \frac{e^{j2\pi L\epsilon}}{\sqrt{N}} \sum_{n=0}^{N-1} z_n e^{-j2\pi n(k-\epsilon)/N} + w_{n+LN}'$$

The correlation $\Gamma$ in time of the received and FFTed repeated samples is:

$$\Gamma = \sum_{k=0}^{N-1} R_k R_k'^* \quad (16)$$

with a statistical average of:

$$\langle \Gamma \rangle = e^{j2\pi L\epsilon} \sum_{k=0}^{N-1} |R_k|^2 \quad (17)$$

so that a non-biased estimator for the normalized frequency offset $\epsilon$ is given by:

$$\hat{\epsilon} = -\frac{\angle \Gamma}{2\pi L} \quad (18)$$

This derivation assumes the same (flat) channel over the two correlated symbols and any unpredictable phase variation in between would lead to a wrong estimate in equation (18). Therefore the time interval between the correlated symbols should be small enough to fulfill this requirement.

Figure 10:
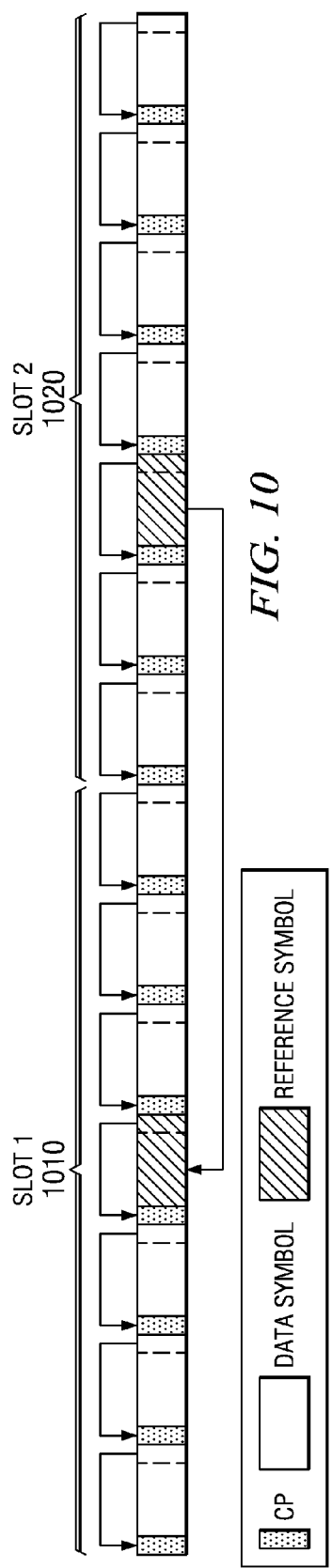
FIG. 10 illustrates a maximum-likelihood algorithm which tests a number of frequency offset hypothesis on the demodulation reference symbols (DMRS) located at the centre of each slot according to this invention.

This method is especially attractive for its low-complexity when applied to OFDM systems because it can make use of either the repeated reference symbols or the inherent duplication of the OFDM symbol tail in the cyclic prefix. FIG. 10 illustrates the sub-frame structure defined in the LTE standard. The sub-frame includes two 0.5 ms slots (slot 1 and slot 2). Each slot includes six DFT-SOFDM (also denoted as SC-FDMA) data symbols and one central reference symbol. Both the cyclic prefix (CP) correlation of each symbol and the reference symbols correlation are used in a combined estimator.

For each UE two de-mapped reference symbols of each sub-frame are correlated in the frequency domain. The LTE specification allows for both intra sub-frame frequency hopping and sequence hopping in either a base sequence, a cyclic shift or both. In intra sub-frame frequency hopping the sequence of the reference symbol changes from one slot to another. Therefore the symbol cannot be considered anymore as a repeated symbol. In sequence hopping the flat channel assumption of the estimator of equation (18) is violated and the method cannot be used. Therefore for most cases the reference symbol correlation method is impractical for LTE.

Denote $r(n)$ a received OFDM symbol including the CP illustrated in FIG. 10 for samples $n=0, 1, \ldots, N_{FFT}+N_{CP}-1$, where $N_{FFT}$ is the FFT size and $N_{CP}$ is the CP length. The frequency domain correlation method requires converting both the CP and the corresponding tail of the symbol in frequency domain to perform the correlation of equation 16. However this can be derived from the already available FFT of the complete symbol. This saves performing an additional FFT.

Denote $R_{CP}(k)$ as the FFTs of the CP:

$$R_{CP}(k) = \sum_{n=0}^{N_{CP}-1} r(n) e^{-j2\pi kn/N_{FFT}} \quad (19)$$

Denote $R_{Tail}(k)$ as the tail of the OFDM symbol:

$$R_{Tail}(k) = \sum_{n=0}^{N_{CP}-1} r(n+N_{FFT}) e^{-j2\pi kn/N_{FFT}} \quad (20)$$

Denote $R_S(k)$ as the complete OFDM symbol:

$$R_S(k) = \sum_{n=0}^{N_{FFT}-1} r(n+N_{CP})e^{-j2\pi kn/N_{FFT}} \qquad (21)$$

$$= \sum_{n=0}^{N_{FFT}-N_{CP}-1} r(n+N_{CP})e^{-j2\pi kn/N_{FFT}} +$$

$$\sum_{n=N_{FFT}-N_{CP}}^{N_{FFT}-1} r(n+N_{CP})e^{-j2\pi kn/N_{FFT}}$$

The relevant term reflecting the OFDM tail in is the second term, which can be re-written as:

$$R_{S-Tail}(k) = \sum_{m=0}^{N_{CP}-1} r(m+N_{FFT})e^{-j2\pi(m-N_{CP}+N_{FFT})k/N_{FFT}} \qquad (22)$$

$$= R_{Tail}(k)e^{j2\pi k N_{CP}/N_{FFT}}$$

To compensate for the phase difference between the desired $R_{Tail}(k)$ and the available $R_S$, $R_{CP}(k)$ must be weighted by $e^{j2\pi k N_{CP}/N_{FFT}}$ before correlating with $R_S(k)$ and the correlation in equation (16) is computed as:

$$\Gamma = \sum_{k=0}^{N_{SC}-1} R_S(k+k_0)R_{CP}^*(k+k_0)e^{-j2\pi k N_{CP}/N_{FFT}} \qquad (23)$$

where: $N_{SC}$ is the number of allocated sub-carriers starting from sub-carrier $k_0$. Simulations verify that this implementation optimization does not cause any performance degradation compared with using the FFT of only the tail of the OFDM symbol $R_{Tail}(k)$.

This method was originally designed for OFDM systems where only one UE occupies the spectrum at a time. In that case both the CP and the OFDM symbol are free of interference. In OFDMA systems the CP is not interference-free because, unlike the OFDM symbol, its spectrum is not limited to the UEs allocated sub-carriers. The CP spectrums spills over adjacent sub-carriers where other UEs are expected to be scheduled.

Simulation results show that this CP interference results in estimation errors proportional to the frequency offset. Thus the frequency estimates must be used to compensate the frequency offset before computing a new estimation. The only practical method for frequency compensation in OFDMA systems operates in frequency domain on the sub-carriers allocated to the UE. There are two options for the CP: remove the frequency offset on the de-mapped sub-carriers; or remove the frequency offset on the full bandwidth. Removing the frequency offset on the de-mapped sub-carriers is obviously the more attractive from a complexity standpoint. However this truncates the frequency-domain CP, thus resulting in erroneous frequency correction. Removing the frequency offset on the full bandwidth performs an exact frequency correction in absence of any interferer. However, this method suffers from interference as soon as other UEs are multiplexed in the same symbol. Frequency-domain frequency offset generation or compensation method provide exactitude when applied to the OFDM symbol because the Drifted and Interpolated symbol provide results similar to each other.

Thus despite the low complexity of the CP-correlation method, a higher performance method is needed to estimate each UE's frequency offset in LTE. This invention uses the available frequency-domain interference-free symbols de-mapped (or de-multiplexed) at the output of the FFT of an OFDMA multi-user receiver.

The criterion to design a frequency offset estimation algorithm for LTE is that it should circumvent the drawbacks of the state of the art methods. The new method should only operate on the de-mapped interference-free OFDM symbols. The new method should not rely on symbol repetition.

This invention is a maximum-likelihood algorithm which tests a number of frequency offset hypothesis on the demodulation reference symbols (DMRS) located at the center of each slot as shown in FIG. 10. This is expressed as:

$$\hat{\Delta}f = \underset{\delta f}{\mathrm{argmax}}\{M(\delta f)\} \qquad (24)$$

where: the metric $M(\delta f)$ can be computed in a number of ways. A first $M(\delta f)$ computation multiplies the received de-mapped FFT output samples $R_S(k)$ with the complex conjugate of frequency shifted replicas of the expected DMRS frequency-domain sequence $S(k,\delta f_i)$:

$$M(\delta f) = \left| \sum_{k=0}^{N_{SC}-1} R_S(k)S^*(k,\delta f) \right| \qquad (25)$$

A second $M(\delta f)$ computation multiplies the frequency shifted replicas of the received de-mapped FFT output sample $R_{S(k,\delta f_i)}$ with the complex conjugate of the expected DMRS sequence $S(k)$:

$$M(\delta f) = \left| \sum_{k=0}^{N_{SC}-1} R_S(k,\delta f)S^*(k) \right| \qquad (26)$$

Figure 11:
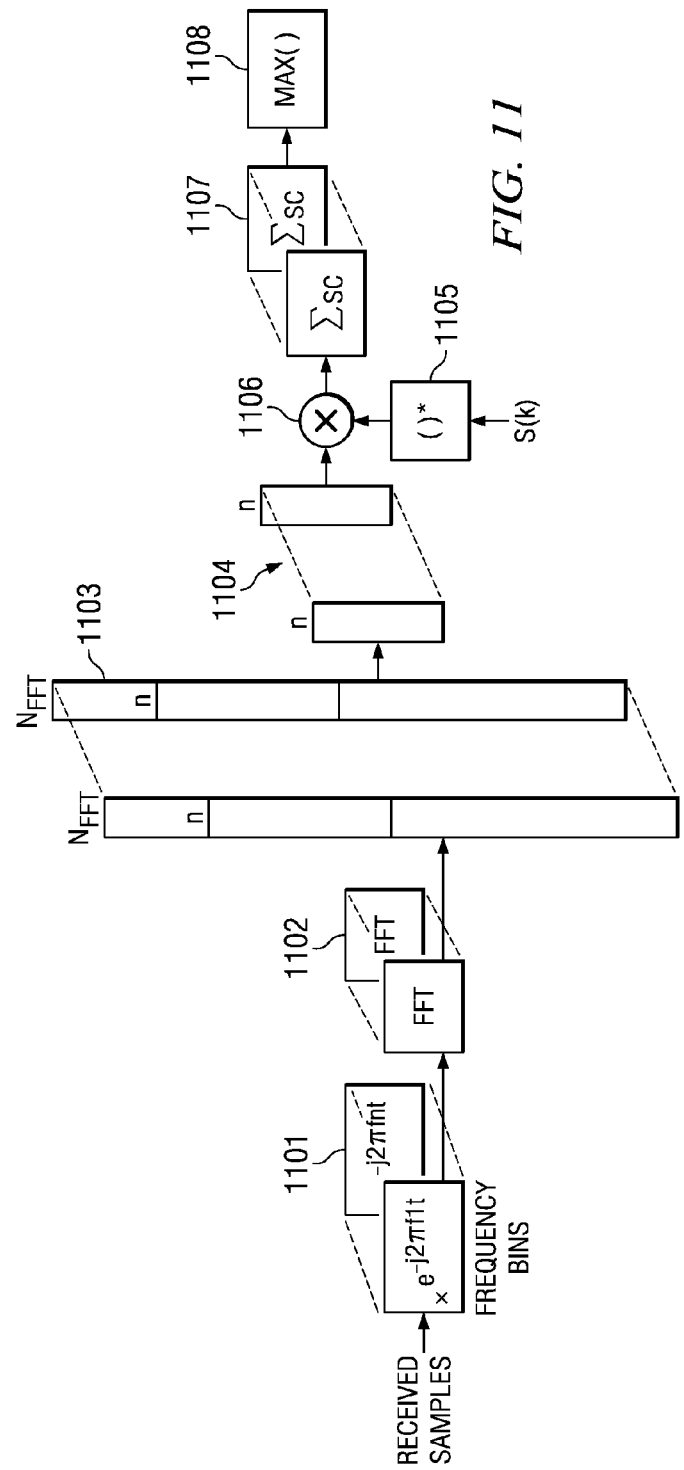
FIG. 11 illustrates computing the metric M(δf) by multiplying the received de-mapped FFT output samples $R_S(k)$ with the complex conjugate of frequency shifted replicas of the expected DMRS frequency-domain sequence $S(k,\delta f_i)$.
Figure 12:
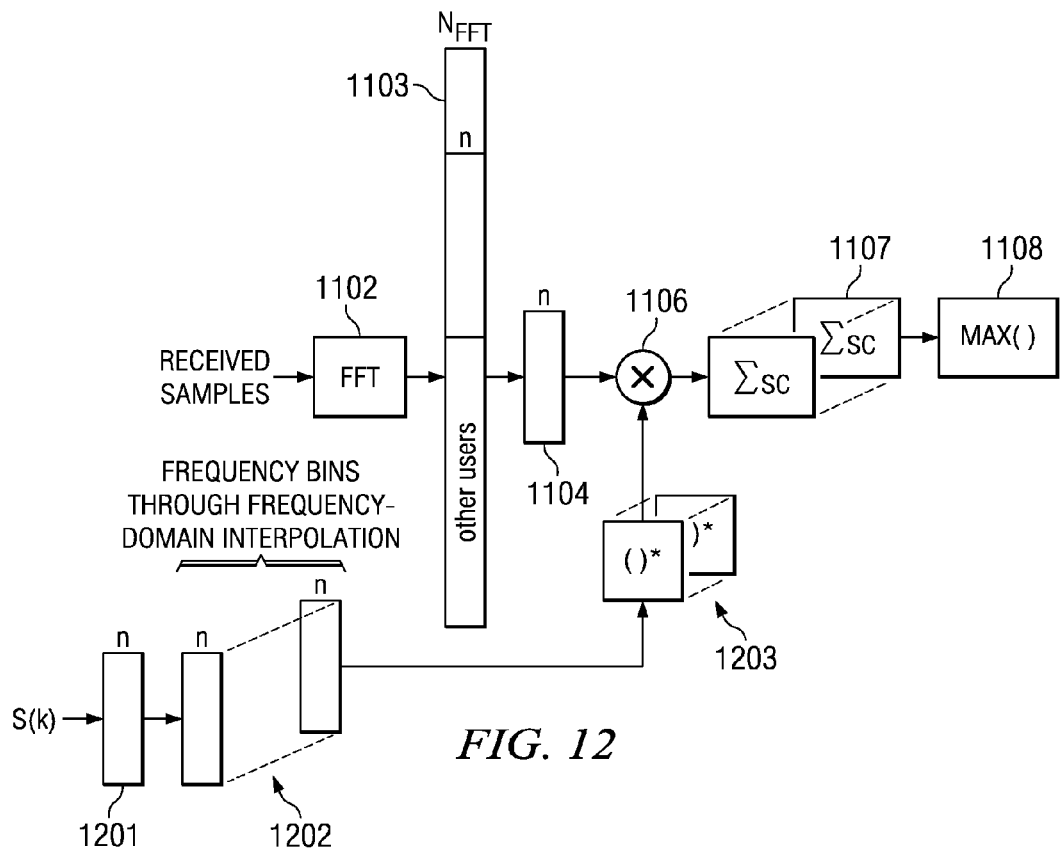
FIG. 12 illustrates computing the metric M(δf) by multiplying the frequency shifted replicas of the received de-mapped FFT output sample $R_{S(k},\delta f_i)$ with the complex conjugate of the expected DMRS sequence S(k)

FIGS. 11 and 12 illustrate the principles of these two approaches. In FIG. 11 the received sampled are divided into frequency bins in bin filter 1101. The binned signals are converted to frequency domain via Fast Fourier Transform (1102). Filter 1103 separates the signals corresponding to individual active UEs in exemplary channel 1104. Multiplier 1105 multiplies the channel signal by the processed DMRS sequence via block 1105. Block 1107 performs the required summation and block 1108 finds the maximum. FIG. 12 operates similarly except the DMRS signal S(k) 1201 is subject to the frequency bins in block 1202. This is processed in block 1203 for multiplication by the corresponding separated channel signal in multiplier 1106.

Both approaches can be simplified using the frequency-domain frequency offset generation or compensation method to build the frequency bins. The two approaches are equivalent in performance-wise. This application describes the first approach. For DMRS sequence planning with hopping disabled, the frequency bins $S^*(k,\delta f)$ of a given UEs DMRS sequence can be pre-computed and stored in a LUT. Enabling sequence hopping might result in a reduced set of expected sequences per UE where the LUT approach is also beneficial. For the worst-case cell configuration where DMRS sequences change on every slot (known as base sequence group hopping) for a given slot $S(k,\delta f)$ is the same for all UEs.

Figure 13:
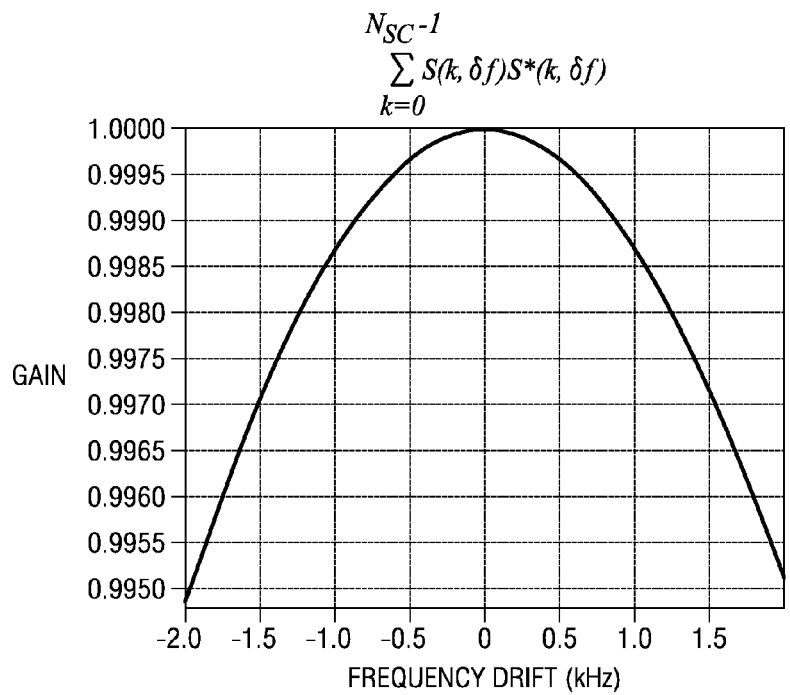
FIG. 13 illustrates the continuous frequency signal of a DMRS sequence (Drifted Symbol) and specifically an extended Zadoff-Chu sequence (EZC)
Figure 14:
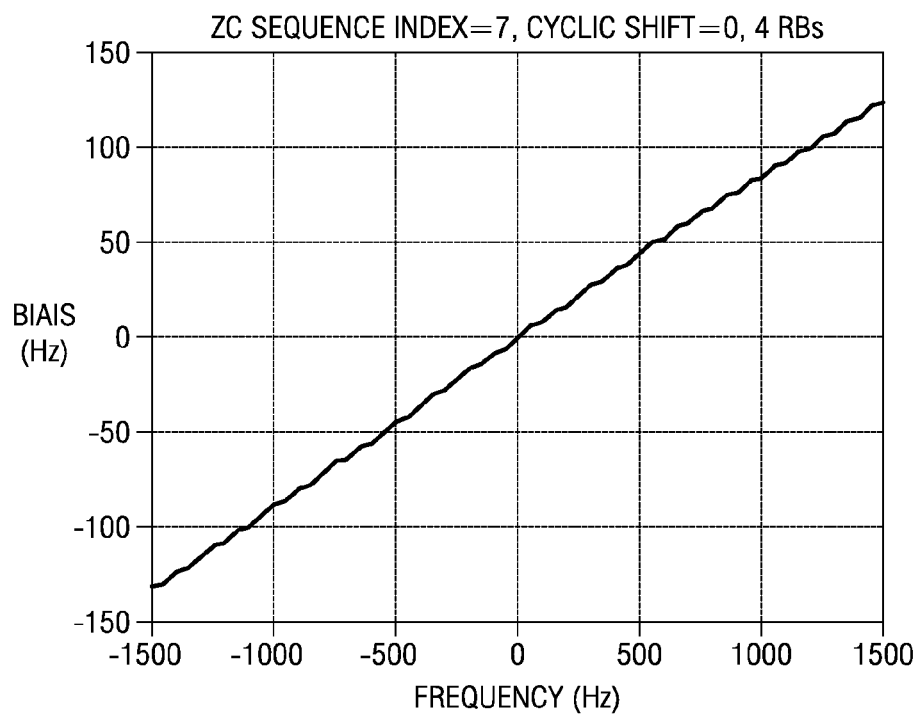
FIG. 14 illustrates the corresponding bias of the FO estimator illustrated in FIG. 13.

FIG. 13 illustrates the continuous frequency signal of a DMRS sequence (Drifted Symbol) and specifically an extended Zadoff-Chu sequence (EZC). FIG. 14 illustrates the corresponding bias of the FO estimator. FIG. 13 shows the constant amplitude property of such sequence does not hold true between the sub-carrier centre positions located at integer multiples of 15 kHz. Thus FIG. 14 does not illustrate a constant gain across the frequency range. Thus a frequency offset estimator is required.

The metric gain is a function of the sequence including the EZC index and cyclic shift and the number of allocated sub-carriers $G(S, N_{SC}, \delta f)$:

$$G(S, N_{SC}, \delta f) = \sum_{k=0}^{N_{sc}-1} S(k, \delta f)S^*(k, \delta f) \quad (27)$$

and can be compensated for in the estimator metric as follows:

$$M(\delta f) = \sqrt{G(S, N_{SC}, \delta f)} \left| \sum_{k=0}^{N_{sc}-1} R_S(k)S^*(k, \delta f) \right| \quad (28)$$

or as follows:

$$M(\delta f) = \frac{\left| \sum_{k=0}^{N_{sc}-1} R_S(k)S^*(k, \delta f) \right|}{\sqrt{G(S, N_{SC}, \delta f)}} = \frac{\left| \sum_{k=0}^{N_{sc}-1} R_S(k)S^*(k, \delta f) \right|}{\sqrt{\sum_{k=0}^{N_{sc}-1} |S(k, \delta f)|}} \quad (29)$$

The resulting metric is no longer biased. This can be mathematically verified by checking that it is always maximum at the received frequency offset:

$$\left. \frac{dM(\delta f)}{d\delta f} \right|_{\delta f = \delta f_u} = 0 \quad (30)$$

where: $\delta f_u$ is the frequency offset of the received sequence $R_S(k)$.

Figure 15:
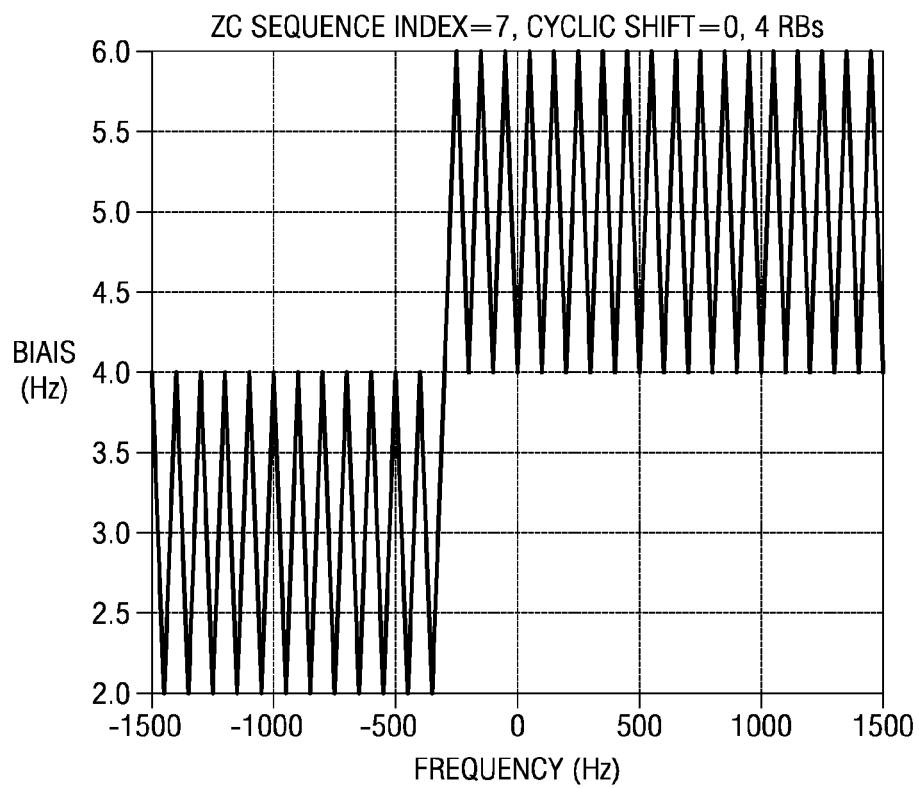
FIG. 15 illustrates the residual bias of a compensated estimator.

FIG. 15 illustrates the resulting residual bias of the associated estimator, which is now only due to the quantization of the searched frequency space (frequency bins). In the case of no sequence hopping or if sequence hopping leads to a reduced set of expected sequences per UE, the gain compensation factor $\sqrt{G}$ in equation (27) can be incorporated in the frequency bins $S^*(k, \delta f)$ stored in LUT.

The maximum likelihood metric assumes a flat channel across the allocated sub-carriers of a given UE. This is not the case under fading conditions especially for large allocation sizes. Equalizing the de-mapped sub-carriers $R_S(k)$ with the frequency-domain channel estimates $\hat{H}(k)$ before frequency estimation circumvents this issue as follows:

$$R_{S-eq}(k) = R_S(k)\hat{H}(k) \quad (31)$$

Using the simplest channel estimation derived from weighting the received de-mapped samples with the complex conjugate of the expected frequency-domain DMRS sequence is:

$$\hat{H}(k) = R_S(k)S^*(k) \quad (32)$$

As a result, the metric is now upgraded to apply to fading channels as follows:

$$M(\delta f) = \sqrt{G(S, N_{SC}, \delta f)} \left| \sum_{k=0}^{N_{sc}-1} |R_S(k)|^2 S(k, 0)S^*(k, \delta f) \right| \quad (33)$$

The metric of equation (33) only operates on DMRS symbols and is accumulated over antennas, slots and sub-frames as follows:

$$M(S_f, \delta f) = \sum_{s_f=1}^{S_f} \sum_{a=1}^{N_a} \sum_{s_l=1}^{2} m(a, s_l, s_f, N_{SC}, \delta f) \text{ with} \quad (34)$$

$$m(a, s_l, s_f, N_{SC}, \delta f) =$$

$$\left| \sum_{k=0}^{N_{sc}-1} \frac{|R_{DMRS}(k + k_0, a, s_l, s_f)|^2}{S(k, s_l, s_f, 0)S^*(k, s_l, s_f, \delta f)} \right| \sqrt{G(s_l, s_f, N_{SC}, \delta f)}$$

where: $\delta f$ is the frequency offset hypothesis; $S_f$ is the estimation interval duration in sub-frames; k is the sub-carrier index; $s_l$ is the slot index; a is the antenna index; $s_f$ is the sub-frame index; $S(\ldots, \delta f)$ is the frequency shifted replica of the DMRS sequence expected in slot $s_l$ of sub-frame $s_f$, and computed according to equations (1) and (2); $R_{DMRS}(\ldots)$ is the FFT samples of the DMRS symbol of slot $s_l$ in sub-frame $s_f$ from antenna a; G is the gain compensation factor of equation (27); and $N_{SC}$ is the number of allocated sub-carriers starting from sub-carrier $k_0$.

The resulting frequency estimator for this estimation interval is:

$$\hat{\Delta}f(S_f) = \arg\max_{\delta f}\{M(S_f, \delta f)\} \quad (35)$$

$$\hat{H}(k) = R_S(k)S^*(k) \quad (36)$$

As a result, the metric is now upgraded to apply to fading channels as follows:

$$M(\delta f) = \frac{\left| \sum_{k=0}^{N_{sc}-1} R_S(k)\overline{[R_S(k)S^*(k, 0)]}^* S^*(k, \delta f) \right|_{\substack{channel\ estimates \\ for\ fading \\ channel}}}{\sqrt{\sum_{k=0}^{N_{sc}-1} S(k, \delta f)S^*(k, \delta f)}} \quad (37)$$

$$= \frac{\left| \sum_{k=0}^{N_{sc}-1} |R_S(k)|^2 S(k, 0)S^*(k, \delta f) \right|}{\sqrt{\sum_{k=0}^{N_{sc}-1} |S(k, \delta f)|^2}}$$

This is referred to as the frequency-bins with common channel estimation method. The method of equation (29) is referred to as the frequency-bins without channel estimation method.

The estimator of equation (37) is biased even without fading because the introduced channel estimate term $R_S(k)S^*(k,$ 0) has a non-constant gain across the frequency offset range of the received sequence $R_S(k)$. This is fixed by estimating the channel specifically for each frequency hypothesis δf and normalizing the resulting metric as follows:

$$M(\delta f) = \frac{\left| \sum_{k=0}^{N_{sc}-1} R_S(k) \overbrace{[\overline{R_S(k)S^*(k,\delta f)}]^* S^*(k,\delta f)}^{\text{frequency-specific channel estimates for fading channel}} \right|}{\sqrt{\sum_{k=0}^{N_{sc}-1} [S(k,\delta f)S^*(k,\delta f)]^2}} \qquad (38)$$

$$= \frac{\sum_{k=0}^{N_{sc}-1} |R_S(k)|^2 |S(k,\delta f)|^2}{\sqrt{\sum_{k=0}^{N_{sc}-1} |S(k,\delta f)|^4}}$$

This is referred to as the frequency-bins with per-bin channel estimation method.

Figure 16:
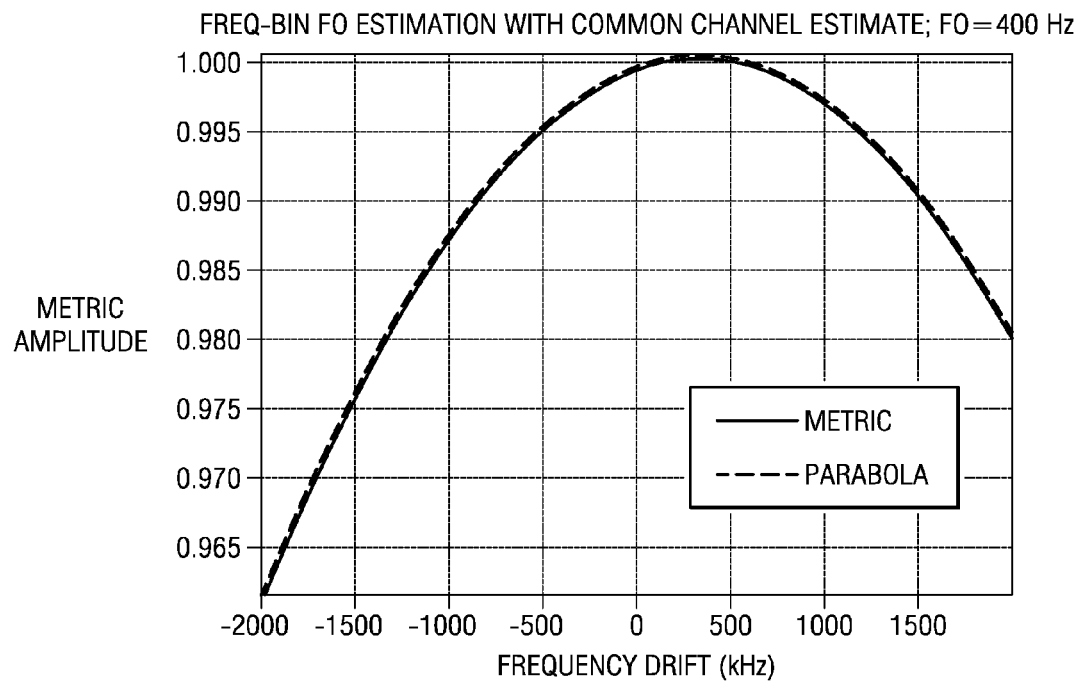
FIG. 16 illustrates that the frequency-bins with common channel estimation method can be mapped onto a parabola.
Figure 17:
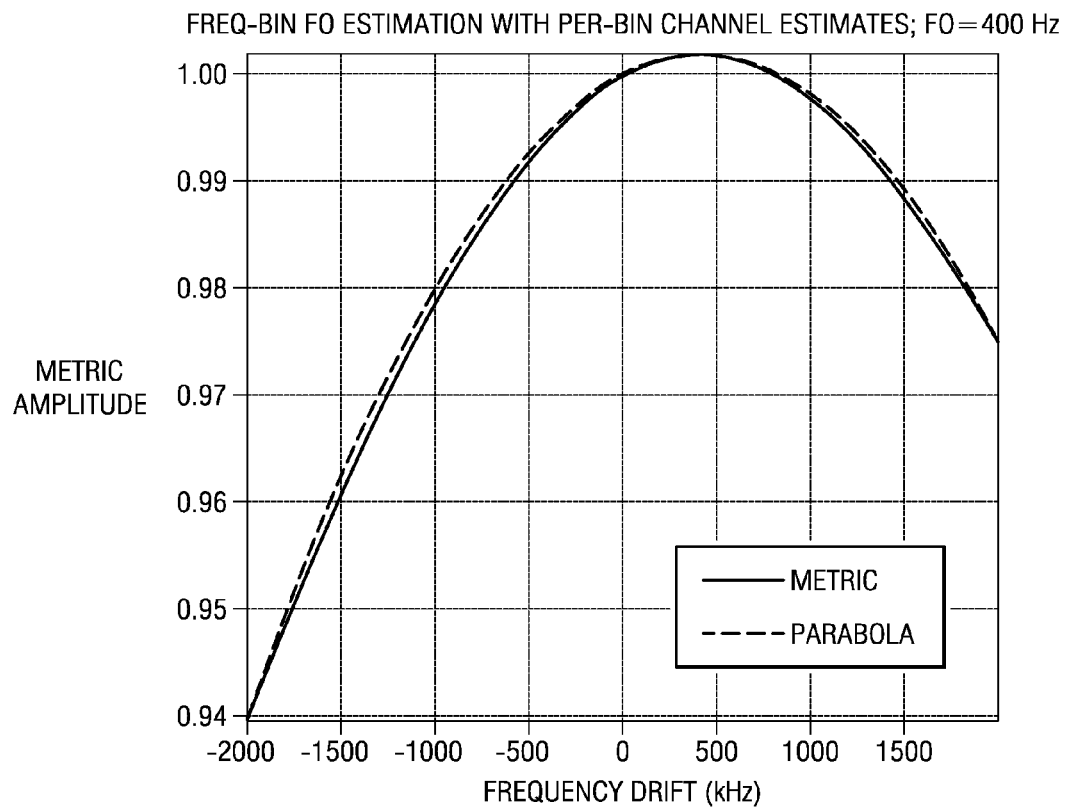
FIG. 17 illustrates that the frequency-bins with per-bin channel estimation method can be mapped onto a parabola.

One concern with this frequency-bin approach is the complexity associated with the number of bins needed to cover a sufficient frequency range with an adequate granularity. This can be solved by restricting the number of bins to only three in the searched frequency window: $[-f_{max}, 0, f_{max}]$ and using a parabolic interpolation to locate the position of the metric maximum. FIGS. 16 and 17 illustrate that both the frequency-bins with common channel estimation method for equation (37) or the frequency-bins with per-bin channel estimation method of equation (38) can be mapped onto a parabola.

Three Cartesian points $(x_i, y_i)$ for $i=1, 2, 3$ where $y_i = ax_i^2 + bx_i + c$, the abscissa $x_{max}$ of the maximum $y_{max}$ of the parabola is given by:

$$x_{max} = \frac{1}{2}\left[ x_1 + x_2 - \frac{(x_1-x_3)(x_3-x_2)(y_1-y_2)}{(y_1-y_3)(x_1-x_2) - (y_1-y_2)(x_1-x_3)} \right] \qquad (39)$$

This reduces significantly the complexity of the frequency-bin approach and makes it a viable alternative to correlation-based approaches.

The frequency range covered by the frequency bins is constant during an estimation interval to allow for consistent accumulation of the metrics of equations (37) and (38). Dynamic control across estimation intervals narrows down, when possible, the scope of the searched frequency offset. Empirical simulations identified the following frequency window adaptation scheme:

$$\begin{cases} f_{searched} \in [-f_{max} \quad f_{max}] \\ \text{with } f_{max} = \min\{200 \text{ Hz; } \max\{2000 \text{ Hz; } 3\hat{\delta f}\}\} \end{cases} \qquad (40)$$

where: δf is the residual frequency estimate of the previous estimation interval.

The metrics of equations (37) and (38) involve the power of the received frequency domain samples. This results in a sub-optimal estimator since squaring increases the estimator variance. In another embodiment of this invention a novel metric expression for frequency offset estimation mitigates the estimator variance increase using absolute values instead of powers. A normalization function maintains a normalized gain providing a non-biased estimator as follows:

$$M(\delta f) = \frac{\sum_{k=0}^{N_{sc}-1} |R_S(k)||S(k,\delta f)|}{\sqrt{\sum_{k=0}^{N_{sc}-1} |S(k,\delta f)|^2}} \qquad (41)$$

This method is referred to as frequency-bins with min-variance per-bin channel estimation. This approach also reduces the complexity as the absolute value $|z|$ of $z=x+j*y$ is accurately approximated as follows. Let $a=\max(|x|,|y|)$ and $b=\min(|x|,|y|)$. If $b>a/4$, $|z|=0.875*a+0.5*b$. Otherwise, $|z|=a$. Thus computation of equation (41) requires 4 additions/subtractions in 2's complement arithmetic.

Figure 18:
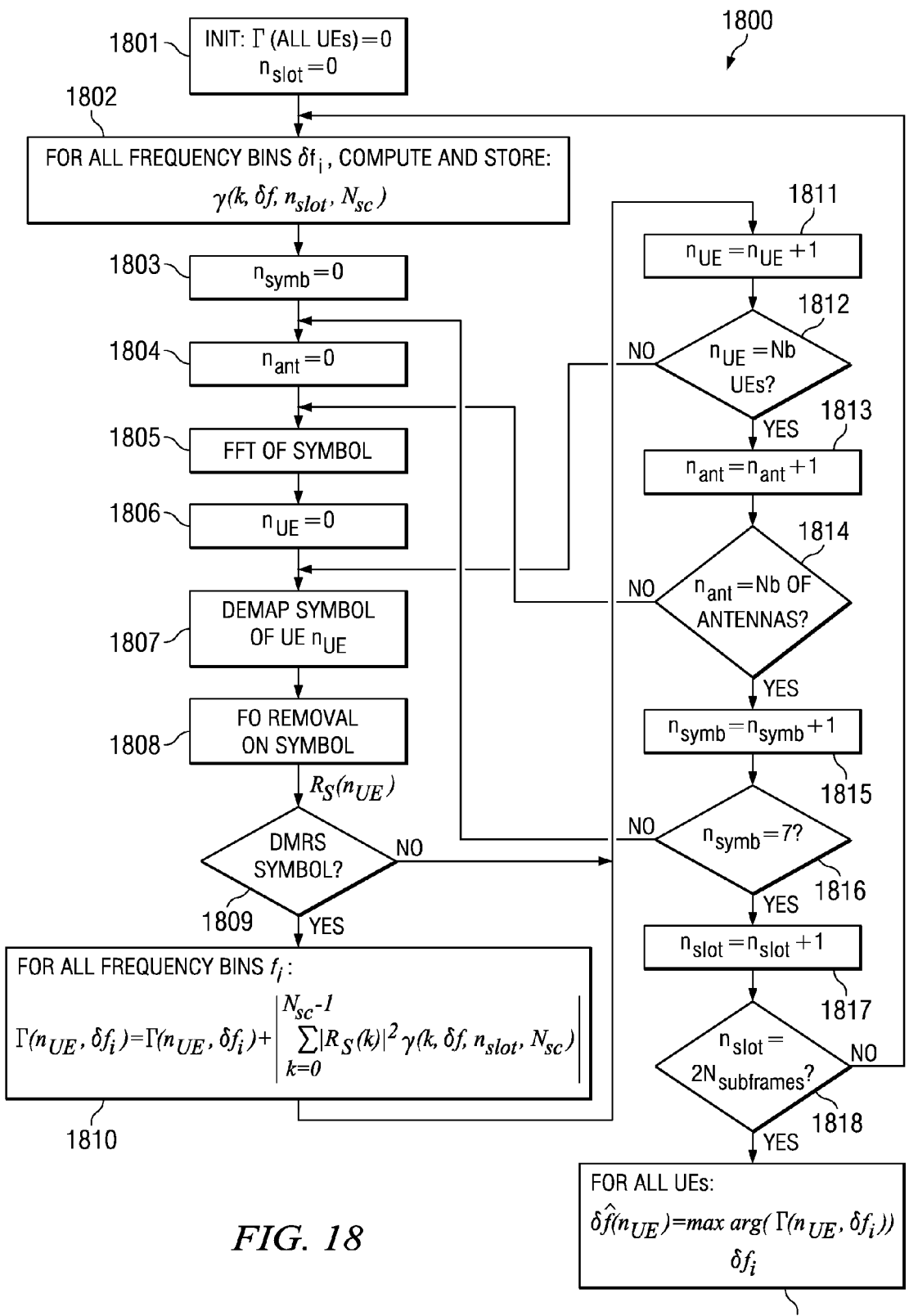
FIG. 18 is a flow chart illustrating the frequency offset estimation and compensation algorithm of this invention.
Figure 19:
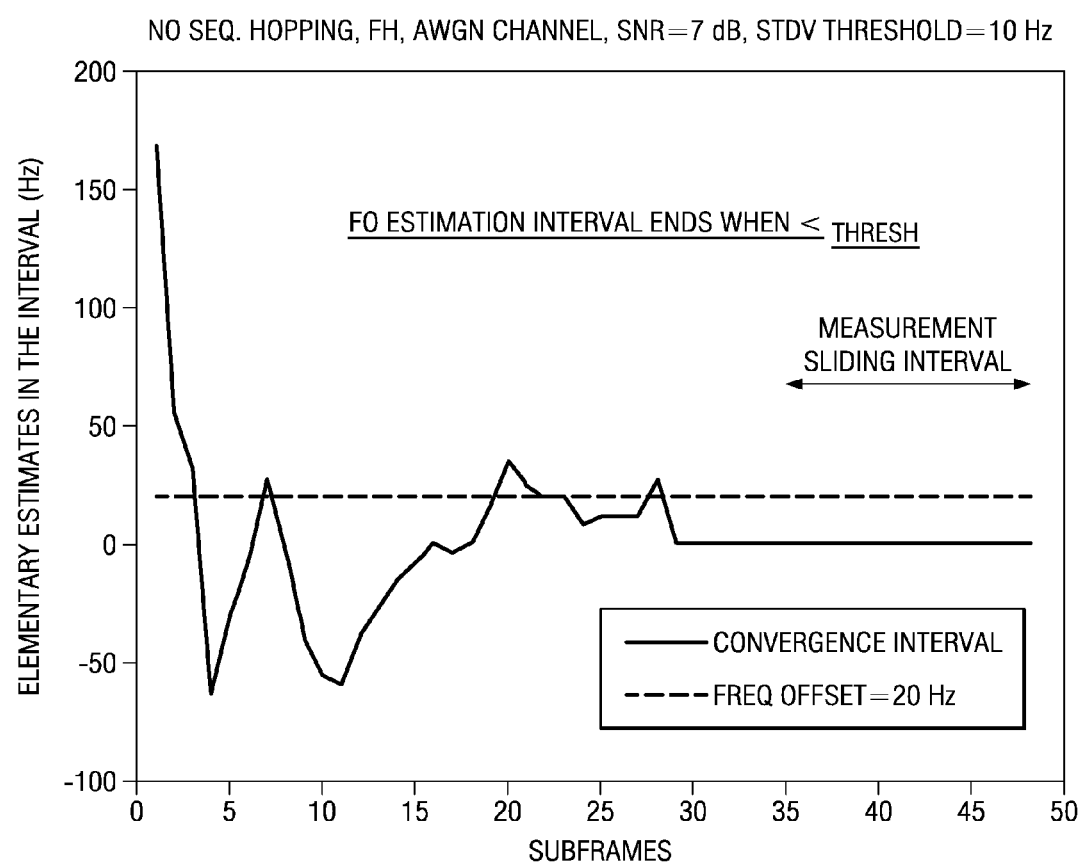
FIG. 19 illustrates the time behavior of the frequency elementary estimates within an estimation interval obtained from simulation.

FIG. 18 is a flow chart 1800 illustrating the complete frequency offset estimation and compensation algorithm. Flow chare 1800 begins with initialization of the data for all UEs and $n_{slot}$ in step 1801. Step 1801 computes and stores the value of $\gamma(k, \delta f, n_{slot}, N_{SC})$ for all frequency bins. Step 1803 sets $n_{symb}$ to zero. Step 1804 sets $n_{ant}$ to zero. Step 1805 performs a Fast Fourier Transform of the next symbol. Step 1806 sets $n_{symb}$ to zero. Step 1807 demaps the symbol of UE $n_{UE}$. Step 1808 performs a frequency offset (FO) removal of the symbol producing $R_S(n_{UE})$. Step 1809 tests to determine if the current symbol is a DMRS symbol. If this is true (Yes at step 1809), then step 1810 calculates $\Gamma(n_{UE}, \delta f_i)$ for all frequency bins $\delta f_i$. Flow then advances to step 1811. If this is not true (No at step 1809), then flow advances to step 1811. Step 1811 increments $n_{UE}$. Step 1812 tests to determine if $n_{UE}$ equals the number $N_b$ of UEs. If not true (No at step 1812), flow loops back to step 1807. If true (Yes at step 1812), the flow advances to step 1813. Step 1813 increments $n_{ant}$. Step 1814 tests to determine if $n_{ant}$ equals the number $N_b$ of antennas. If not true (No at step 1814), flow loops back to step 1805. If true (Yes at step 1814), the flow advances to step 1815. Step 1815 increments $n_{symb}$. Step 1816 tests to determine if $n_{symb}$ equals seven. If not true (No at step 1816), flow loops back to step 1804. If true (Yes at step 1816), the flow advances to step 1817. Step 1817 increments $n_{slot}$. Step 1818 tests to determine if $n_{slot}$ equals twice $N_{subframes}$. If not true (No at step 1818), flow loops back to step 1802. If true (Yes at step 1819), the flow advances to step 1819. Step 1819 completes the calculation of the frequency offset for all UEs.

FIG. 18 illustrates the scheduling of the functions involved with the frequency-bin based estimators. The difference between the various estimators is the metric used and the maximum argument algorithm. This maximum argument algorithm could be a basic maximum or a parabolic interpolation. More specifically, the set of coefficients $\gamma(k, \delta f, n_{slot}, N_{sc})$ is given by:

$$\begin{cases} \gamma(k, \delta f, n_{slot}, N_{sc}) = \frac{S(k,0)S^*(k,\delta f)}{\sqrt{\sum_{k=0}^{N_{sc}-1}|S(k,\delta f)|^2}}; \text{ common channel estimate} \\ \gamma(k, \delta f, n_{slot}, N_{sc}) = \frac{|S(k,\delta f)|^2}{\sqrt{\sum_{k=0}^{N_{sc}-1}|S(k,\delta f)|^4}}; \text{ per bin channel estimate} \end{cases} \qquad (42)$$

The duration of each estimation interval is controlled dynamically via a stopping criterion. This stopping criterion is the standard deviation of the elementary estimates $\hat{\Delta}f(S_f-L+1), \hat{\Delta}f(S_f-L+2), \ldots, \hat{\Delta}f(S_f)$ in an L-length sliding window ending on the last estimate $\hat{\Delta}f(S_f)$ of the current interval. FIG.

19 illustrates the time behavior of the frequency elementary estimates within an estimation interval obtained from simulation.

The value of the standard deviation threshold $\sigma_{thresh}$ used as stopping criterion is optimized using simulations. A link-level simulator with ideal frequency offset compensation with only one UE, no timing errors and the a varying number of allocated RBs. The average durations in number of sub-frames of the estimation interval for various values of the stopping criterion $\sigma_{thresh}$. Beyond $\sigma_{thresh}$=50 Hz the estimation interval duration does not improve further and remains at about 30 sub-frames.

The BLER performance of the PUSCH with 2 RB allocations for various values of the stopping criterion $\sigma_{thresh}$ using QPSK and 16QAM modulation varies. Using the largest value of $\sigma_{thresh}$ of 50 Hz does not degrade the BLER compared to smaller values. As a result $\sigma_{thresh}$=50 Hz minimizes the estimation interval duration to 30 sub-frames while achieving high performance BLER for both QPSK and 16QAM modulations.

The frequency range covered by the frequency bins is constant during an estimation interval to allow for consistent accumulation of the metric of equation (34). The frequency range is dynamically controlled across estimation intervals in order to narrow down when possible the scope of the searched frequency offset. For simplicity the frequency range of the frequency bins of this invention is preferably limited to four uncertainty windows: +/−2000 Hz; +/−1000 Hz; +/−500 Hz; and +/−200 Hz. After each estimation interval, the algorithm selects the smaller uncertainty window not exceeding three times the last estimated frequency offset. The preferred embodiment of this invention uses 100 frequency bins regardless the uncertainty window. Note that too fine a frequency granularity is overkill and this number may be reduced to provide about 20 Hz frequency granularity.

The performance of both the CP-correlation and frequency-bins algorithms in a realistic multi-user SC-FDMA multiplex with ideal and real frequency offset compensation was evaluated via simulation. For the CP-correlation algorithm the estimated frequency offset was subtracted from the modeled frequency offset of the UE under test. For the frequency-bins algorithm the estimated frequency offset was compensated in the receiver. In both cases the simulator models a number of UEs with equal allocation size sharing the total bandwidth. The frequency mapping of the UEs was re-selected randomly every sub-frame and intra sub-frame frequency hopping was enabled. The DMRS sequence of the UEs was selected randomly for each new estimation interval but was kept the same within the estimation interval by allowing no sequence hopping. The simulator modeled timing errors of the UEs were chosen randomly within a maximum time uncertainty window. The other UEs other than the UE under test were given random power and frequency offsets within maximum uncertainty windows. The CP-correlation method was modeled using the same algorithm except that equation (34) was used as the accumulated metric and all symbols of the sub-frame were used in the accumulation. Table 3 lists all parameters of the simulation.

TABLE 3

| Parameter | Value or range |
| --- | --- |
| System Bandwidth | 5 MHz |
| Number of users | 6 |
| Number of scheduled RBs | 4 |
| MCS | QPSK ⅓-16QAM ½ |

TABLE 3-continued

| Parameter | Value or range |
| --- | --- |
| RS sequences | EZC with random selection of ZC index and cyclic shift across freq estimation intervals |
| Scheduling scheme | Frequency hopping, no sequence hopping within frequency estimation interval |
| Frequency estimation methods | CP correlation on all symbols and frequency bins on DMRS symbols only |
| Number of frequency bins | 100 |
| Frequency search window size | Initial: +/−2 kHz, then dynamically adapted as a function of the estimated frequency |
| $\sigma$ measurement interval size | 5 sub-frames |
| $\sigma_{thresh}$ | 50 Hz |
| Frequency compensation | Ideal, based on FO estimates, or real method at the receiver. In the latter case, CP FO compensation is implemented on either de-mapped CP or full bandwidth CP. |
| Max timing uncertainty window | +/−0.5 μs |
| Max frequency uncertainty window (other UEs) | +/−500 Hz |
| Max power offset uncertainty (other UEs) | +/−3 dB |
| Channels | AWGN, TU6-3 km/h, High Speed Train #3 |

The following evaluation uses as performance criterions the statistics of the residual frequency offset error after estimation and compensation and the resulting Block Error Rate (BLER). The following evaluation provides the statistics of the mean, standard deviation and the sum of both so as to reflect the overall performance of the estimator/compensation scheme.

This set of simulations allows assessing the impact of non-orthogonal CP in the CP correlation method. The frequency offsets are initialized to 800 Hz for AWGN channels and 300 Hz for TU channels. Then, every new frequency offset estimate is subtracted from the UEs current frequency offset. For both AWGN and TU channels the frequency bin method is insensitive to synchronization and power errors. This is not the case of the CP correlation method which outperforms the frequency bin method in ideal synchronization conditions but performs worse as soon as a realistic multiplex is modeled. In this case the frequency bin method outperforms the CP correlation method despite working on one instead of seven symbols per slot.

This set of simulations allows assessing the impact of both the non-orthogonal CP method and the practical (non-ideal) CP frequency offset compensation method. The 3GPP RAN WG#4 specified High Speed Train (HST) scenarios with time-varying frequency offsets specifically addressing the high performance frequency tracking requirements of LTE receivers. These simulations use the third scenario out of the three scenarios. This provides the sharpest frequency variations.

For the CP correlation method, simulations tested both wideband CP and de-mapped CP FO compensation methods. The CP correlation method produces erroneous average estimates at both ends of the Doppler shift and that compensating the FO on the wideband CP slightly outperforms the compensation on the de-mapped CP. Of the three tested methods, only the frequency bin method allows accurate tracking of the Doppler shift trajectory. All algorithms but the frequency bins have error floors at high SNR, where the frequency offset has larger impact on the BLER.

The simulations assessed the performance of the various metrics elaborated for the frequency-bin approach including: frequency-bins without channel estimation; frequency-bins with common channel estimation; and frequency-bins with per-bin channel estimation.

As expected, the metric of equation (29) designed to optimize the AWGN channel performance outperforms the other metrics as long as an ideal SC-FDMA multiplex is achieved. In a realistic multiplex where other UEs also experience some timing errors within the range tolerated by LTE, frequency errors and power differences, the performance of this metric becomes worse than the other metrics. Thus the frequency-bins without channel estimation method is not suitable in practice for real systems. The two remaining metrics including the common channel estimation and the per-bin channel estimation have very similar performance on the static AWGN channel and are insensitive to the interference resulting from non-ideal multiplexing in all channels. The metrics for the per-bin channel estimation shows better frequency offset tracking than the metric with common channel estimation. This is due to the FO-dependent bias upon AWGN of the former metric which is fixed in the latter metric thus accelerating the convergence when tracking FO variations. On the other hand, the metric with common channel estimation is more robust in fading channels. As a result, the preferred embodiment of this invention uses the metric involving per-bin channel estimation on AWGN channels and the metric involving common channel estimation on fading channels.

The frequency-bins with per-bin channel estimation metric of equation (38) is used for the AWGN and HST#3 channels and the frequency-bins with common channel estimation metric of equation (37) is used for the TU 3 km/h channel. The parabolic interpolation method improves the performance with respect to the brute-force equal-spaced frequency bin approach. This is due to the resulting non-quantized frequency offset estimate. The parabolic interpolation scheme is quite robust with respect to a non-interference-free realistic multiplex.

This patent application describes in details the design choices for the LTE frequency offset estimation and compensation, from theoretical derivations and performance evaluations. In particular, it is shown that the state-of-the-art does not satisfactorily addresses the high-end performance requirements of LTE so that an alternate approach is needed. A maximum-likelihood based solution is provided, taking profit of the available frequency-domain interference-free symbols de-mapped (or de-multiplexed) at the output of the FFT of an OFDMA multi-user receiver.

What is claimed is:

1. A method of wireless transmission for estimating the carrier frequency offset in a base station of a received Orthogonal Frequency Division Multiplexing (OFDM) transmission from a user equipment (UE) accessing an Orthogonal Frequency Division Multiplexing Access (OFDMA) radio access network, comprising:
   receiving a transmission from the UE at one of a plurality of antennas at the base station;
   extracting selected OFDM symbols from the OFDM symbol multiplex of a received sub-frame employing a-priori known sub-carrier modulation of the selected symbols;
   computing the frequency-domain symbols received from each antenna through a Fast Fourier Transform (FFT);
   de-mapping from the frequency-domain symbols the UEs selected sub-carriers of the OFDMA sub-carrier multiplex for each antenna;
   computing from each de-mapped symbol from each antenna N metrics $M_i$ for i=1, . . . , N, each associated to a carrier frequency offset hypothesis $\delta f_i$ wherein a set of carrier frequency offset hypothesis spans a searched frequency offset window;
   performing the steps of receiving, extracting, computing the frequency-domain symbols, de-mapping and computing metrics $M_i$ on subsequent received sub-frames from the UE over an estimation interval duration;
   non-coherently accumulating across the estimation interval and all antennas the computed metrics $M_{i,n}$ associated to the carrier frequency offset hypothesis $\delta f_i$ for each carrier frequency offset hypothesis $\delta f_i$; and
   selecting the carrier frequency offset hypothesis with largest accumulated metric amplitude as the estimated carrier frequency offset estimate.

2. The method of claim 1, wherein:
the selected OFDM symbols are demodulation reference OFDM symbols (DMRS) provisioned in support of channel estimation.

3. The method of claim 1, wherein:
the selected OFDM symbols are reconstructed demodulated OFDM symbols.

4. The method of claim 1, wherein:
the OFDMA symbols are Single Carrier Frequency Division Multiple Access (SC-FDMA) symbols.

5. The method of claim 1, wherein:
the OFDMA symbols are Discrete Fourier Transform Orthogonal Frequency Division Multiple Access (DFT-SOFDMA) symbols.

6. The method of claim 1, wherein:
said step of computing the estimator metric $M_i$ corresponding to carrier frequency offset hypothesis $\delta f_i$ includes:
   for each de-mapped sub-carrier k multiplying a transform of a de-mapped FFT output sub-carrier sample $R_S(k)$ and a transform of a frequency shifted replica $S(k,\delta f_i)$ of the frequency-domain sequence symbol expected on sub-carrier k thereby producing a product;
   summing the product across all de-mapped sub-carriers k thereby producing a sum; and
   dividing the sum by a normalization factor.

7. The method of claim 6, wherein:
the normalization factor is selected to provide a non-biased estimation.

8. The method of claim 6, wherein:
the metric selected for addressing single UE in the OFDMA multiplex with Additive White Gaussian Noise (AWGN) channel wherein:
   the transform of the received de-mapped FFT output sub-carrier sample $R_S(k)$ is the identity transform leaving $R_S(k)$ unchanged;
   the transform of the frequency shifted replica $S(k,\delta f_i)$ is the complex conjugate $S(k,\delta f_i)^*$ of $S(k,\delta f_i)$; and
   the normalization factor is the square root of the sum of across de-mapped sub-carriers of the squared frequency shifted replica $S(k,\delta f_i)$ $$\sqrt{\sum_{k=0}^{N_{sc}-1} |S(k,\delta f)|^2} \ .$$

9. The method of claim 6, wherein:

the metric selected for multiple UEs in the OFDMA multiplex with fading channel and slow varying frequency offset wherein:

the transform of the received de-mapped FFT output sub-carrier sample $R_S(k)$ is the square of the absolute value of $R_S(k)$ $|R_s(k)|^2$;

the transform of the frequency shifted replica $S(k,\delta f_i)$ is the square of the absolute value of $S(k,\delta f_i)$ $|S(k,\delta f)|^2$; and the normalization factor is the square root of the sum of across de-mapped sub-carriers of the fourth power frequency shifted replica $S(k,\delta f_i)$ $$\sqrt{\sum_{k=0}^{N_{sc}-1} |S(k,\delta f)|^4}.$$

10. The method of claim 6, wherein:

the metric selected for addressing multiple UEs in the OFDMA multiplex with fading channel and fast varying frequency offset wherein:

the transform of the received de-mapped FFT output sub-carrier sample $R_S(k)$ is the square of the absolute value of $R_S(k)$ $|R_s(k)|^2$;

the transform of the frequency shifted replica $S(k,\delta f_i)$ is the square of the absolute value of $S(k,\delta f_i)$ $|S(k,\delta f_i)|^2$; and the normalization factor is the square root of the sum of across de-mapped sub-carriers of the squared frequency shifted replica $S(k,\delta f_i)$ $$\sqrt{\sum_{k=0}^{N_{sc}-1} |S(k,\delta f)|^4}.$$

11. The method of claim 6, further comprising:

selecting a metric for addressing multiple UEs in the OFDMA multiplex with fading channel and fast varying frequency offset wherein:

the transform of the received de-mapped FFT output sub-carrier sample $R_S(k)$ is absolute value of $R_S(k)$ $|R_s(k)|$;

the transform of the frequency shifted replica $S(k,\delta f_i)$ is the absolute value of $S(k,\delta f_i)$ $|S(k,\delta f)|$; and the normalization factor is the square root of the sum of across de-mapped sub-carriers of the squared frequency shifted replica $S(k,\delta f_i)$ $$\sqrt{\sum_{k=0}^{N_{sc}-1} |S(k,\delta f)|^2}.$$

12. The method of claim 6, wherein:

the frequency shifted replica $S(k,\delta f_i)$ is constructed in frequency domain using an interpolation-based frequency-domain frequency offset generation technique defined as:

$$Z_i(k,\varepsilon) = \sum_{l=0}^{N_{sc}-1} Z(l) C(l-k,\varepsilon); k = 0, 1, \ldots N_{SC}-1$$

where: $N_{SC}$ is the UE allocation size, in sub-carriers; $\varepsilon$ is the normalized frequency shift: $\varepsilon = \delta f/\Delta f_{sc}$; $Z(l)$ is the de-mapped frequency points of the UE corresponding to the $N_{SC}$-point DFT of the original time-domain samples $z(n)$; $C(l-k,\varepsilon)$ is the interpolator coefficients; and $Z_i(k,\varepsilon)$ is the interpolated point from the $Z(l)$ points, and:

$$C(k,\varepsilon) =$$

$$\frac{\sin(\pi(k+\varepsilon))/N_{FFT}}{\sin(\pi(k+\varepsilon)/N_{FFT})} e^{j\pi(k+\varepsilon)\frac{N_{FFT}-1}{N_{FFT}}} \approx \text{sinc}[\pi(k+\varepsilon)] e^{j\pi(k+\varepsilon)\frac{N_{FFT}-1}{N_{FFT}}}$$

for $k = -N_{SC}+1, -N_{SC}+2, \ldots 0, 1, \ldots N_{SC}-1$ where: $N_{FFT}$ is the FFT size and $$\text{sinc}(x) = \frac{\sin(x)}{x}.$$

13. The method of claim 6, wherein:

the frequency shifted replicas $S(k,\delta f_i)$ are constructed from a frequency domain de-mapped samples $Z(k)$ through a combined inverse discrete Fourier Transform (IDFT)/discrete Fourier Transform (DFT) as defined below:

$$Z(k,\varepsilon) = FFT_{2N_{SC}}\{z_p(n)c_\varepsilon(n)\}; k=0,1,\ldots N_{SC}-1; n=0, 1,\ldots 2N_{SC}-1$$

where: $FFT_N$ is the N-point FFT; $z_p(n)$ is the $2N_{SC}$-point IDFT of $Z_p(k)$, reflecting a 2× time-domain over-sampling with respect to the original sampling rate of $z(n)$; $Z_p(k)$ is a zero-padded extension of $Z(k)$, the de-mapped frequency points of the UE, to get a $2N_{SC}$ length vector:

$$Z_p(k) = \begin{cases} 0; k = 0, 1, \ldots, N_{SC}-1 \\ Z(k-N_{SC}); k = N_{SC}, N_{SC}+1, \ldots, 2N_{SC}-1 \end{cases}$$

and $c_\varepsilon(n) = e^{j2\pi\gamma n}$ where the equivalent normalized frequency $\gamma$ is given by $$\gamma = \frac{1}{2}\left(1 + \frac{\varepsilon}{N_{SC}}\right).$$

14. The method of claim 1, wherein:

the number N of frequency hypothesis is restricted to 3 in the searched frequency offset window $[-f_{max}\ 0\ f_{max}]$ by using a parabolic interpolation to locate the position of the metric maximum where, given the three Cartesian points $(x_i, y_i)$, $i=1, 2, 3$ such that $y_i = a\ x_i^2 + b\ x_i + c$, the abscissa $x_{max}$ of the maximum $y_{max}$ of the parabola is given by:

$$x_{max} = \frac{1}{2}\left[x_1 + x_2 - \frac{(x_1-x_3)(x_3-x_2)(y_1-y_2)}{(y_1-y_3)(x_1-x_2)-(y_1-y_2)(x_1-x_3)}\right].$$

15. The method of claim 1, wherein:
the estimated carrier frequency offset obtained during a previous estimation interval is removed from the received OFDM symbols after symbol de-mapping and before metric computation during a current estimation interval.

16. The method of claim 15, wherein:
the estimated carrier frequency offset is removed from the received OFDM symbols using an interpolation-based frequency-domain frequency offset generation technique defined as:

$$Z_i(k, \varepsilon) = \sum_{l=0}^{N_{SC}-1} Z(l)C(l-k, \varepsilon); k = 0, 1, \ldots N_{SC} - 1$$

where: $N_{SC}$ is the UE allocation size, in sub-carriers; $\varepsilon$ is the normalized frequency shift: $\varepsilon = \delta f / \Delta f_{sc}$; $Z(l)$ is the de-mapped frequency points of the UE corresponding to the $N_{SC}$-point DFT of the original time-domain samples $z(n)$; $C(l-k, \varepsilon)$ is the interpolator coefficients; and $Z_i(k, \varepsilon)$ is the interpolated point from the $Z(l)$ points, and:

$$C(k, \varepsilon) = \frac{\sin(\pi(k+\varepsilon))/N_{FFT}}{\sin(\pi(k+\varepsilon)/N_{FFT})} e^{j\pi(k+\varepsilon)\frac{N_{FFT}-1}{N_{FFT}}} \approx \operatorname{sinc}[\pi(k+\varepsilon)] e^{j\pi(k+\varepsilon)\frac{N_{FFT}-1}{N_{FFT}}}$$

for $k = -N_{SC} + 1, -N_{SC} + 2, \ldots 0, 1, \ldots N_{SC} - 1$ where: $N_{FFT}$ is the FFT size and $$\operatorname{sinc}(x) = \frac{\sin(x)}{x}.$$

17. The method of claim 15, wherein:
the estimated carrier frequency offset is removed from the received OFDM symbols using a combined inverse discrete Fourier Transform (IDFT)/discrete Fourier Transform (DFT) as defined below:

$Z(k,\varepsilon) = FFT_{2N_{SC}}\{z_p(n)c_\varepsilon(n)\}; k=0,1,\ldots N_{SC}-1;$
$n=0,1,\ldots 2N_{SC}-1$ where: $FFT_N$ is the N-point FFT; $z_p(n)$ is the $2N_{SC}$-point IDFT of $Z_p(k)$, reflecting a 2× time-domain over-sampling with respect to the original sampling rate of $z(n)$; $Z_p(k)$ is a zero-padded extension of $Z(k)$, the de-mapped frequency points of the UE, to get a $2N_{SC}$ length vector:

$$Z_p(k) = \begin{cases} 0; k = 0, 1, \ldots, N_{SC} - 1 \\ Z(k - N_{SC}); k = N_{SC}, N_{SC} + 1, \ldots 2N_{SC} - 1 \end{cases}$$

and $c_\varepsilon(n) = e^{j2\pi\gamma n}$ where the equivalent normalized frequency $\gamma$ is given by $$\gamma = \frac{1}{2}\left(1 + \frac{\varepsilon}{N_{SC}}\right).$$

18. The method of claim 1, further comprising:
selecting a set of frequency bins each having a frequency range for each estimation interval, the frequency range covered by the frequency bins of an estimation interval being adjusted across estimation intervals with respect to a last obtained frequency estimation.

19. The method of claim 18, wherein:
the frequency offset window is adapted as follows:

$$\begin{cases} f_{searched} \in [-f_{max} \; f_{max}] \\ \text{with } f_{max} = \min\{200 \text{ Hz}; \max\{2000 \text{ Hz}; 3\hat{\delta f}\}\} \end{cases}$$

where: $\delta f$ is the residual frequency estimate of the previous estimation interval.

20. The method of claim 1, wherein:
the estimation intervals have a constant duration.

21. The method of claim 1, wherein:
the duration of each estimation interval is controlled dynamically with a stopping criterion involving a measured standard deviation across elementary estimates of a sliding window at the end of the estimation interval.

* * * * *